(12) United States Patent
Yu et al.

(10) Patent No.: US 12,124,051 B2
(45) Date of Patent: Oct. 22, 2024

(54) MULTI-LENS CAMERA LENS, CAMERA MODULE, AND TERMINAL INCLUDING A LENS PROVIDING A DIFFRACTIVE SURFACE CONCAVE TO THE IMAGE SIDE PLANE

(71) Applicant: HUAWEI TECHNOLOGIES CO., LTD., Shenzhen (CN)

(72) Inventors: Feng Yu, Yokohama (JP); Takuya Anzawa, Tokyo (JP); Sayuri Noda, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 875 days.

(21) Appl. No.: 17/111,395

(22) Filed: Dec. 3, 2020

(65) Prior Publication Data

US 2021/0088757 A1    Mar. 25, 2021

Related U.S. Application Data

(63) Continuation of application No. PCT/CN2019/075626, filed on Feb. 21, 2019.

(30) Foreign Application Priority Data

Jul. 26, 2018   (CN) ......................... 201810841618.9

(51) Int. Cl.
*G02B 27/42*       (2006.01)
*G02B 13/00*       (2006.01)

(52) U.S. Cl.
CPC ..... *G02B 27/4205* (2013.01); *G02B 13/0045* (2013.01); *G02B 13/0055* (2013.01); *G02B 27/4211* (2013.01)

(58) Field of Classification Search
CPC ............ G02B 27/4205; G02B 13/0045; G02B 13/0055; G02B 27/4211
See application file for complete search history.

(56) References Cited

U.S. PATENT DOCUMENTS 5,959,785 A    9/1999  Adachi
9,507,126 B2  11/2016  Tang et al.
(Continued)

FOREIGN PATENT DOCUMENTS

CN    203673137 U    6/2014
CN    204536638 U    8/2015
(Continued)

OTHER PUBLICATIONS

MIL-HDBK-141 "Military Standardization Handbook Optical Design" Oct. 1962, p. 8-15 (Year: 1962).*
(Continued)

*Primary Examiner* — George G. King

(57) ABSTRACT

From an object plane to an image plane along an optical axis, a camera lens including a first lens, a diffractive optical element and a lens module is provided in various embodiments. The first lens has a positive focal power. The diffractive optical element has a positive focal power and a negative dispersion property. A surface that is of the diffractive optical element or the first lens and that faces the object plane side is a convex surface at the optical axis, a surface that is of the diffractive optical element or the first lens and that faces the image plane side is a concave surface at the optical axis. The lens module includes N lenses. At least one of a surface facing the object plane side and a surface facing the image plane side that are of each of the N lenses is an aspheric surface.

14 Claims, 11 Drawing Sheets

(56) References Cited

U.S. PATENT DOCUMENTS

| | | |
|---|---|---|
| 9,720,211 B2 | 8/2017 | Ishizaka |
| 2002/0015231 A1 | 2/2002 | Ogawa |
| 2011/0310486 A1 | 12/2011 | Eguchi |
| 2012/0081790 A1* | 4/2012 | Yasui ................ G02B 27/4205 359/570 |
| 2012/0092779 A1 | 4/2012 | Maetaki |
| 2012/0229921 A1* | 9/2012 | Eguchi ........... G02B 15/143107 359/784 |
| 2013/0301143 A1 | 11/2013 | Obama |
| 2018/0120582 A1* | 5/2018 | Kobayashi ......... G02B 27/4211 |

FOREIGN PATENT DOCUMENTS

| | | |
|---|---|---|
| CN | 105929520 A | 9/2016 |
| CN | 106990517 A | 7/2017 |
| CN | 109031592 A | 12/2018 |
| JP | 3720767 B2 | 11/2005 |
| JP | 6172951 B2 | 8/2017 |

OTHER PUBLICATIONS

Chinese-language Notice of Allowance issued in Chinese Application No. 201810841618.9 dated Sep. 3, 2020 (4 pages).

Chinese-language Office Action issued in Chinese Application No. 201810841618.9 dated Feb. 27, 2020 (9 pages).

Chinese-language International Search Report & Written Opinion (PCT/ISA/220, PCT/ISA/210, & PCT/ISA/237) issued In PCT Application No. PCT/CN2019/075626 dated Apr. 29, 2019 (12 pages).

Donald C. O'shea et al: "Diffractive Lens Design", Diffractive Optics, Dec. 29, 2003 (Dec. 29, 2003), pp. 57-82, XP055562113.

European Office Action issued in European Application No. 19840161.4 mailed Jun. 30, 2023.

* cited by examiner

MULTI-LENS CAMERA LENS, CAMERA MODULE, AND TERMINAL INCLUDING A LENS PROVIDING A DIFFRACTIVE SURFACE CONCAVE TO THE IMAGE SIDE PLANE

CROSS-REFERENCE TO RELATED APPLICATIONS

This application is a continuation of International Application No. PCT/CN2019/075626, filed on Feb. 21, 2019, which claims priority to Chinese Patent Application No. 201810841618.9, filed on Jul. 26, 2018. The disclosure of the aforementioned application is hereby incorporated by reference in its entireties.

TECHNICAL FIELD

The present invention relates to the field of optical imaging technologies, and in particular, to a camera lens, a camera module, and a terminal.

BACKGROUND

In recent years, with development of intelligent terminal technologies, a photographing function has become a necessary function feature of many intelligent terminals (for example, a smartphone). Taking a smartphone as an example, a technology of a camera lens has rapidly developed as the camera lens acts as a core component of a camera module of the smartphone. As time goes by and technologies develop, a user has increasing demands for miniaturization of the smartphone and high imaging quality (wide aperture) of the photographing function.

Usually, evaluation parameters of high imaging quality include aberration optical indicators such as a chromatic aberration and a monochromatic aberration (including astigmatism, distortion, a spherical aberration, and the like). To obtain high imaging quality, sufficiently large optical space is required to balance different aberrations. The wide aperture may be obtained by balancing the monochromatic aberration through an adjustment of an aspheric coefficient, a lens distance, and the like that are of a lens in the camera lens. However, with the wide aperture, the chromatic aberration is usually difficult to control. In the prior art, the following two methods are usually available for eliminating the chromatic aberration.

In one method, a low-dispersion optical material is selected to produce a lens, which helps eliminate the chromatic aberration. For example, a lens made of a glass material has relatively low dispersion, and a lens made of a plastic material has relatively high dispersion. However, using the glass material to produce a lens requires better processing techniques and relatively high costs, greatly limiting application of the lens on the camera lens of the smartphone.

In the other method, several lenses are added to the camera lens to better eliminate the chromatic aberration. For example, currently, a high-end camera lens usually uses a six-lens combination, and to further eliminate the chromatic aberration to improve imaging quality, many enterprises are actively developing a technology of a seven-lens combination or an eight-lens combination. However, this method is likely limited by a size of the smartphone, and contradicts a lightening and thinning trend of the smartphone.

In addition, in the prior art, the camera lens of the smartphone is designed mainly for an image sensor of 1/3.2 inches to 1/3.0 inches, and generally, a total track length (TTL) of the camera lens is approximately 5.0 mm. However, with evolution of hardware performance of the smartphone, an image sensor with a larger size (for example, 1/2.8 inches to 1/2.3 inches) and a higher resolution starts to be widely used. As a size of the image sensor becomes increasingly larger, currently a mainstream camera lens design scheme inevitably causes a further increase of a TTL parameter. However, due to a limitation of the size of the smartphone, it is difficult to further increase a total thickness and an area of the camera lens. In addition, it is more difficult to implement both miniaturization and high imaging quality.

In conclusion, for the design of the camera lens, it is a severe technical challenge to meet requirements for miniaturization and high imaging quality in addition to a requirement for a size increase of the image sensor.

SUMMARY

Embodiments provide a camera lens, a camera module, and a terminal. The camera lens can meet requirements for miniaturization and high imaging quality in addition to a requirement for a size increase of an image sensor.

According to a first aspect, an embodiment provides a camera lens. From an object plane to an image plane along an optical axis, the camera lens includes: a first lens, a second lens, and a lens module. The second lens is a diffractive optical element; and the diffractive optical element is between the first lens and the lens module, and is isolated from the first lens and the lens module. Optical axes of the first lens, the diffractive optical element, and N lenses in the lens module are mutually overlapped.

The first lens includes two surfaces opposite to each other. The surface facing the object plane side is a convex surface at the optical axis, the surface facing the image plane side is a concave surface at the optical axis, and the first lens has a positive focal power.

The diffractive optical element includes two layers of different optical materials and an optical diffraction grating between the two layers of optical materials. In other words, the diffractive optical element includes a surface facing the object plane side, a surface facing the image plane side, and a diffractive surface between the two surfaces. The surface facing the object plane side is a convex surface at the optical axis, the surface facing the image plane side is a concave surface at the optical axis, and the diffractive optical element has a positive focal power. Because the diffractive optical element has a negative abnormal dispersion (negative dispersion for short) property, the diffractive optical element may be used to cancel positive dispersion of refractive elements (for example, L1 and the lens module).

The lens module includes N lenses arranged at intervals along the optical axis, and N is an integer greater than or equal to 3 and less than or equal to 7. At least one of a surface facing the object plane side and a surface facing the image plane side that are of each of the N lenses is an aspheric surface, and the lens module has a positive focal power, so as to balance monochromatic aberrations such as a spherical aberration and astigmatism.

It can be learned that, on one hand, with the camera lens provided in this embodiment of the present invention, positive dispersion of refractive elements (such as L1 and the lens module) can be canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement a wide aperture for image sensors of different sizes (for example, large-size image sensors of 1/2.8 inches to 1/2.3 inches), to improve imaging quality. In addition, based on the foregoing structural features of the camera lens for implementing this embodiment of the present invention, a relatively short TTL can be implemented by optimizing physical parameters (such as an aspheric coefficient, a thickness, a lens material, and a refractive index) of each lens of the camera lens, so as to meet a miniaturization requirement of the camera lens. In other words, the camera lens provided in this embodiment of the present invention can not only implement both miniaturization and high imaging quality, but also meet a requirement of a size increase of the image sensor.

Based on the first aspect, in one implementation, an aperture value Fno (F value) of the camera lens is between 2.0 to 1.2, for example, F1.6, F1.5, and F1.4. An amount of light admitted by the camera lens can be increased by using a wide aperture. Therefore, imaging definition and color accuracy in a night scene or an indoor scene are improved, and an image stabilization requirement for photographing and video recording is reduced.

Based on the first aspect, in one implementation, all lenses in the camera lens may be made of plastic materials. Therefore, implementing this embodiment of the present invention further helps reduce costs of the camera lens. Specifically, L1 may specifically use a low-dispersion cyclic olefin material. A lens in the lens module may use a conventional lens material (for example, a high-dispersion polycarbonate material or a low-dispersion cyclic olefin material) based on a structural design of the camera lens. In the diffractive optical element, a lens material between the surface facing the object plane side and the diffractive surface uses a low-dispersion sulfur resin material, and a range condition of a refractive index N1 of the material is 1.62<N1<1.76. A lens material between the diffractive surface and the surface facing the image plane side uses a high-dispersion polycarbonate material or a modified alkane material, and a range condition of a refractive index N2 of the material is 1.55<N2<1.64.

Based on the first aspect, in one implementation, in the diffractive optical element, a focal power of the material between the surface facing the object plane side and the diffractive surface is P1, a focal power of the material between the surface facing the image plane side and the diffractive surface is P2, and P1 and P2 meet the following condition: −4<P1/P2<4. The focal power P1 and the focal power P2 of the diffractive optical element, a focal power $P_{front}$ of a lens in front of the diffractive optical element (namely, the focal power of the first lens L1), and a focal power $P_{last}$ of a lens behind the diffractive optical element (namely, a focal power of a third lens L3 in the lens module) may further meet the following conditions: Abs(P1/$P_{front}$)<4; and Abs(P2/$P_{last}$)<Abs(P1/$P_{front}$), where Abs represents an absolute value function. Because two focal powers are used to disperse the focal power, a light refraction requirement of a single lens can be reduced, so that monochromatic aberrations such as a spherical aberration, astigmatism, and distortion that are caused by a single large focal power can be reduced, thereby implementing an ultra-wide aperture with a relatively short total track length.

Based on the first aspect, in one implementation, in the diffractive optical element, an Abbe number of the material between the surface facing the object plane side and the diffractive surface to a d line of a sodium spectrum is $V_d21$, an Abbe number of the material between the surface facing the image plane side and the diffractive surface to the d line of the sodium spectrum is $V_d22$, and $V_d21$ and $V_d22$ meet the following conditions respectively: 30<$V_d21$<60; and 20<$V_d22$<40.

In one example implementation, an Abbe number of lens A and an Abbe number of lens B that are of the diffractive optical element, an Abbe number of the lens in front of the diffractive optical element (namely, an Abbe number $V_d1$ of a material used by the first lens L1), and an Abbe number of the lens behind the diffractive optical element (namely, an Abbe number $V_d3$ of a material used by the third lens L3 in the lens module) may further meet the following condition: $V_d1$>$V_d21$>$V_d22$>$V_d3$, or $V_d1$<$V_d21$<$V_d22$<$V_d3$.

Based on the first aspect, in one implementation, a thickness of lens A in the diffractive optical element is H1, and H1 meets 0 mm<H1<0.5 mm; and a thickness of lens B is H2, and H2 meets 0 mm<H2<0.5 mm. A diffraction grating is disposed between lens A and lens B. A grating height Gh of the diffraction grating meets 0 μm<Gh<50 μm; in other words, a thickness of the diffraction grating is between 0-50 μm.

Based on the first aspect, in one implementation, at least one of the surface facing the object plane side and the surface facing the image plane side that are of the diffractive optical element is an aspheric surface, so as to balance monochromatic aberrations such as a spherical aberration and astigmatism. For example, in a specific implementation, the surface facing the object plane side and the surface facing the image plane side that are of the diffractive optical element both are aspheric surfaces.

Based on the first aspect, in one implementation, the two surfaces of the first lens L1 and surfaces of all lenses in the lens module may all be aspheric surfaces, so as to better balance monochromatic aberrations such as a spherical aberration and astigmatism.

Based on the foregoing structural framework in this embodiment of the present invention, the following describes two implementations of the camera lens.

(a) In one implementation, the lens module includes the following four lenses: the third lens, a fourth lens, a fifth lens, and a sixth lens. In other words, the camera lens includes at least six independent lenses: the first lens, the second lens (namely, the diffractive optical element), the third lens, the fourth lens, the fifth lens, and the sixth lens.

The third lens L3 includes two surfaces: a surface facing the object plane side and a surface facing the image plane side. At least one of the two surfaces is an aspheric surface, so as to correct a residual aberration and reduce an astigmatism aberration. Specifically, the surface facing the object plane side is a convex surface at an optical axis X, the surface facing the image plane side may be a convex surface or a concave surface at the optical axis X, and the third lens has a positive focal power.

The fourth lens L4 is in a meniscus shape and includes two surfaces: a surface facing the object plane side and a surface facing the image plane side. The surface facing the object plane side is a concave surface at the optical axis. L4 may be used to correct an on-axis chromatic aberration (which belongs to a chromatism of position), well correct a chromatic difference of magnification, and correct distortion in an image plane of a low image height to an approximately 70% image height. L4 has a relatively weak positive focal power or negative focal power.

The fifth lens L5 includes two surfaces: a surface facing the object plane side and a surface facing the image plane side. The two surfaces may be aspheric surfaces, so as to correct a spherical aberration at a peripheral part of the lens. Using L5 further helps control an angle of light emitted from L5 to an appropriate angle between a low image height and a maximum image height. Specifically, L5 is in a meniscus shape, the surface facing the object plane side is a convex surface at the optical axis X, and the surface facing the image plane side is a concave surface at the optical axis X. In addition, in at least one of the two surfaces, there is a reverse curve point at a location far away from the optical axis X. In other words, a peripheral part of the surface bends towards the object plane side.

The sixth lens L6 includes two surfaces: a surface facing the object plane side and a surface facing the image plane side. The two surfaces may be aspheric surfaces. Specifically, the surface facing the object plane side is a convex surface at the optical axis X, the surface facing the image plane side is a concave surface at the optical axis X, and L6 has a negative focal power, which helps ensure a back focal length, correct astigmatism, and control an incidence angle of main light towards the image sensor. Specifically, in the surface facing the image plane side, there is a reverse curve point at a location far away from the optical axis X. In other words, the surface facing the image plane side is an aspheric surface that is a concave surface near the optical axis X and that is changed into a convex surface gradually at a periphery part of the surface. Therefore, as a focal power of L6 is gradually oriented to a peripheral part of the lens, a negative focal power of L6 is weaker, or the negative focal power of L6 is gradually changed into a positive focal power at the peripheral part. Forming such an aspheric surface helps control an incidence angle of main light towards the image sensor at each image height location. Specifically, the surface facing the object plane side also has an aspheric surface of which a focal power is changed into a positive focal power at a peripheral part. In this way, the peripheral part of lens L6 allocates a required positive focal power to the two surfaces, to prevent a sharp shape change of L6.

(b) In the other implementation, the lens module includes the following five lenses: the third lens, a fourth lens, a fifth lens, a sixth lens, and a seventh lens. In other words, the camera lens includes at least seven independent lenses: the first lens, the second lens (namely, the diffractive optical element), the third lens, the fourth lens, the fifth lens, the sixth lens, and the seventh lens.

The third lens L3 includes two surfaces: a surface facing the object plane side and a surface facing the image plane side. At least one of the two surfaces is an aspheric surface, so as to correct a residual aberration and reduce an astigmatism aberration. Specifically, the surface facing the object plane side is a concave surface at an optical axis X, the surface facing the image plane side may be a convex surface or a concave surface at the optical axis X, and L3 has a negative focal power.

The fourth lens L4 is in a meniscus shape and includes two surfaces: a surface facing the object plane side and a surface facing the image plane side. The surface facing the object plane side is a concave surface at the optical axis. L4 may be used to correct an on-axis chromatic aberration (or referred to as a longitudinal chromatic aberration), and well correct a chromatic difference of magnification. L4 has a relatively weak positive focal power or negative focal power.

The fifth lens L5 includes two surfaces: a surface facing the object plane side and a surface facing the image plane side. The surface facing the object plane side is a concave surface at the optical axis. The two surfaces may be aspheric surfaces, so as to correct a spherical aberration at a peripheral part of the lens.

The sixth lens L6 includes two surfaces: a surface facing the object plane side and a surface facing the image plane side. The surface facing the object plane side is a convex surface at the optical axis, and has a reverse curve point at a location other than the optical axis; and the surface facing the image plane side is a concave surface at the optical axis, and has a reverse curve point at a location other than the optical axis. L6 has a negative focal power.

The seventh lens L7 includes two surfaces: a surface facing the object plane side and a surface facing the image plane side. The two surfaces may be aspheric surfaces. Specifically, the surface facing the object plane side is a convex surface at the optical axis X, the surface facing the image plane side is a concave surface at the optical axis X, and L7 has a negative focal power, which helps ensure a back focal length, correct astigmatism, and control an incidence angle of main light towards the image sensor. Specifically, in the surface facing the image plane side, there is a reverse curve point at a location far away from the optical axis X. In other words, the surface facing the image plane side is an aspheric surface that is a concave surface near the optical axis X and that is changed into a convex surface gradually at a periphery part of the surface. Therefore, as a focal power of L7 is gradually oriented to a peripheral part of the lens, a negative focal power of L7 is weaker, or the negative focal power of L7 is gradually changed into a positive focal power at the peripheral part. Forming such an aspheric surface helps control an incidence angle of main light towards the image sensor at each image height location. Specifically, the surface facing the object plane side also has an aspheric surface of which a focal power is changed into a positive focal power at a peripheral part. In this way, the peripheral part of lens L7 allocates a required positive focal power to the two surfaces, to prevent a sharp shape change of L7.

Based on the first aspect, in one implementation, the camera lens further includes an infrared filter IR. The IR is disposed between the lens module and the image plane (the image sensor), and is configured to cut off and filter an infrared ray, and the like. For example, in implementation (a) of the foregoing two implementations, the camera lens may further include six independent lenses and one infrared filter; and in implementation (b) of the foregoing two implementations, the camera lens may further include seven independent lenses and one infrared filter.

Based on the first aspect, in one implementation, the lenses in the two implementations (a) and (b) may further meet the following conditions:

(1) $50 < V_d1 < 60$, where $V_d1$ represents an Abbe number of the first lens L1 to a d line of a sodium spectrum;

(2) $50 < V_d3 < 60$, where $V_d3$ represents an Abbe number of the third lens L3 to the d line of the sodium spectrum;

(3) $20 < V_d4 < 30$, where $V_d4$ represents an Abbe number of the fourth lens L4 to the d line of the sodium spectrum;

(4) $1 < f1/f21 < 5$, where f1 represents a focal length of the first lens L1, and f21 represents a focal length of the surface facing the object plane side and the diffractive surface that are of the diffractive optical element; and (5) $f21/f22 < 1$, where f22 represents a focal length of the surface facing the image plane side and the diffractive surface that are of the diffractive optical element;

(6) $1 < f1/f21 < 5$, where f1 represents a focal length of the first lens L1, and f21 represents a focal length of surface 3 and a focal length of surface 4 (a focal length of lens A) in the second lens L2 (namely, the diffractive optical element); and (7) f21/f22<1, where f21 represents the focal length of lens A in the second lens L2, and f22 represents a focal length of surface 4 and a focal length of surface 5 (a focal length of lens B) in the second lens L2 (namely, the diffractive optical element).

In this embodiment of the present invention, based on conditions (1) to (5), the Abbe numbers of the first lens L1 to the fourth lens L4 to the d line are separately specified within proper ranges, so that an on-axis chromatic aberration and a chromatic difference of magnification can be well corrected. In addition, a proper plastic material can be easily selected for each lens based on the ranges specified above, so that costs of the camera lens are reduced.

In this embodiment of the present invention, based on conditions (6) and (7), a focal length ratio between the first lens L1 and lens B in the second lens L2 is specified within a proper range, and a focal length ratio between lens A and lens B that are of the second lens L2 is specified within a proper range, so that various aberrations can be corrected while a total track length is shortened.

According to a second aspect, an embodiment of the present invention provides a camera module. The camera module includes the camera lens described in the first aspect and an image sensor. The camera lens is configured to form an optical signal of a photographed object and reflect the optical signal to the image sensor; and the image sensor is configured to convert the optical signal corresponding to the photographed object into an image signal and output the image signal, so as to implement a photographing or video recording function of the camera module.

According to a third aspect, an embodiment of the present invention provides a terminal. The terminal includes a display and the camera module described in the second aspect, and the display is configured to display an image photographed by the camera module. To be specific, the camera module may be applied to terminal products such as a smartphone, a notebook computer, a desktop computer, a tablet computer, a personal digital assistant (PDA), a wearable device, an augmented reality (AR) device, a virtual reality (VR) device, and a monitoring device. In addition, because the camera lens has a relatively short total track length (TTL) and an ultra-wide aperture (such as F1.6, F1.5, or F1.4), an amount of light admitted by the camera lens can be increased by using the wide aperture. Therefore, imaging definition and color accuracy in a night scene or an indoor scene are improved, an image stabilization requirement for photographing and video recording is reduced, and design requirements of image sensors of different sizes are met, thereby facilitating implementations of miniaturization and high performance of the terminal products.

It can be learned that, in the embodiments of the present invention, on one hand, positive dispersion of refractive elements (such as L1 and the lens module) can be canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement an ultra-wide aperture (for example, F1.44) for image sensors of different sizes (for example, large-size image sensors of 1/2.8 inches to 1/2.3 inches), to improve imaging quality. In addition, in the embodiments of the present invention, parameters such as an aspheric coefficient, a thickness, a lens material, and a refractive index of each lens of the camera lens can be optimized to meet a miniaturization requirement of the camera lens (for example, a TTL is 5.12 mm). In other words, the camera lens provided in the embodiments of the present invention can not only implement both miniaturization and high imaging quality, but also meet a requirement of a size increase of the image sensor. In addition, because the diffractive optical element in the camera lens may be made of a plastic material, and the first lens and the lens module may also be made of plastic materials, no low-dispersion glass material or another special inorganic material is required. Therefore, implementing the embodiments of the present invention further effectively reduces costs of the camera lens, meeting commercial application requirements.

Figure 4A:
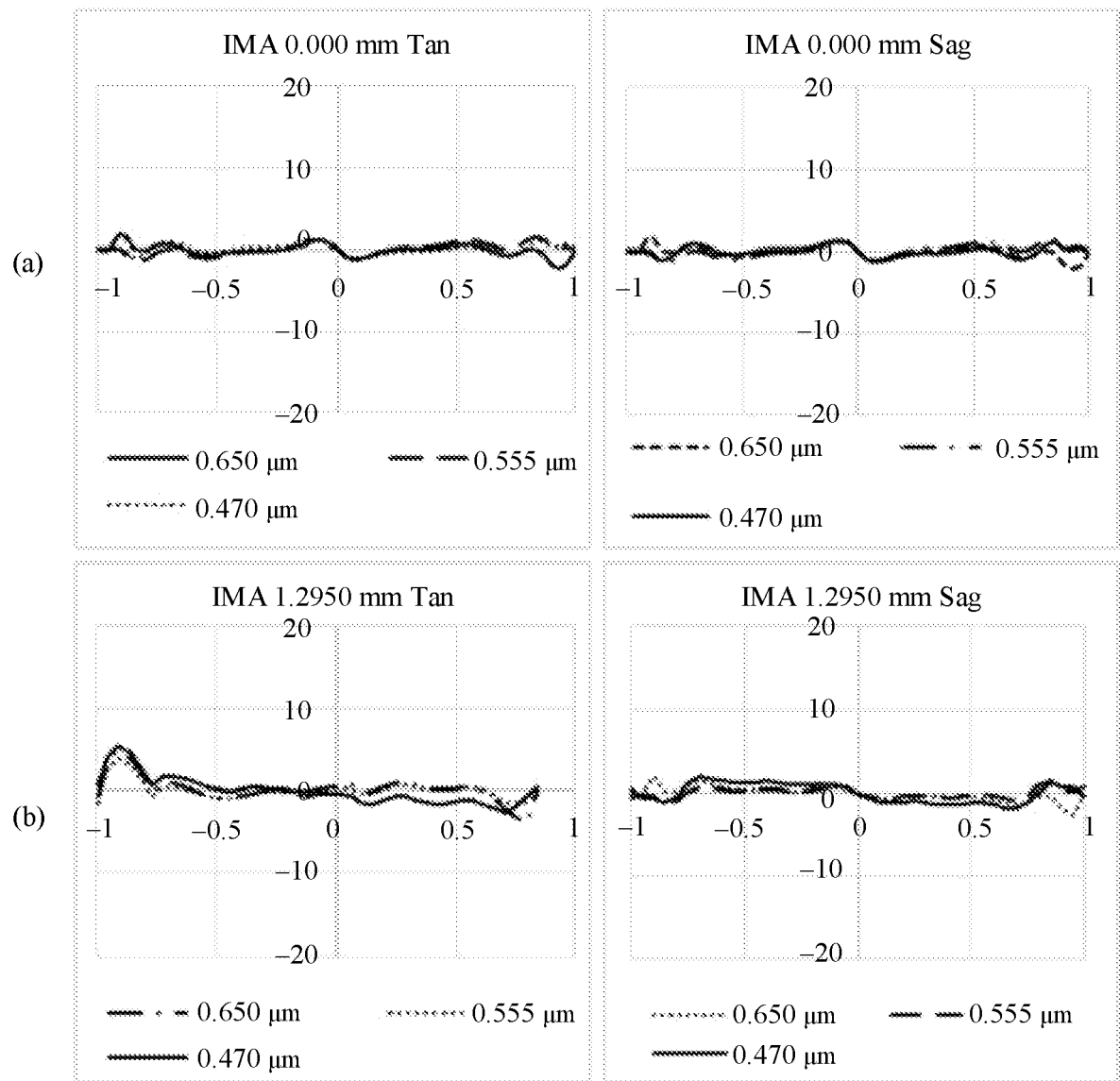
Figure 4B:
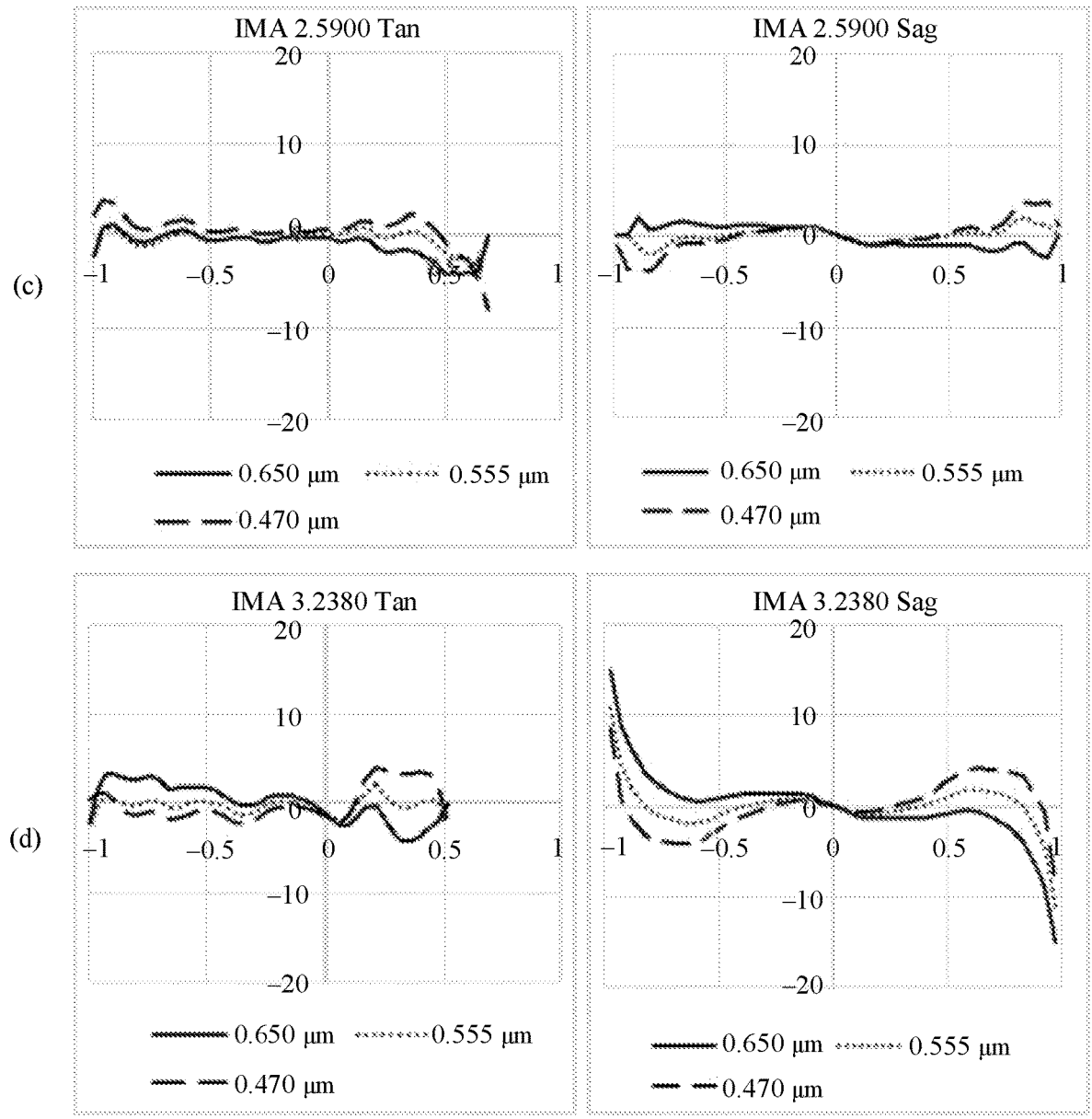
Figure 5:
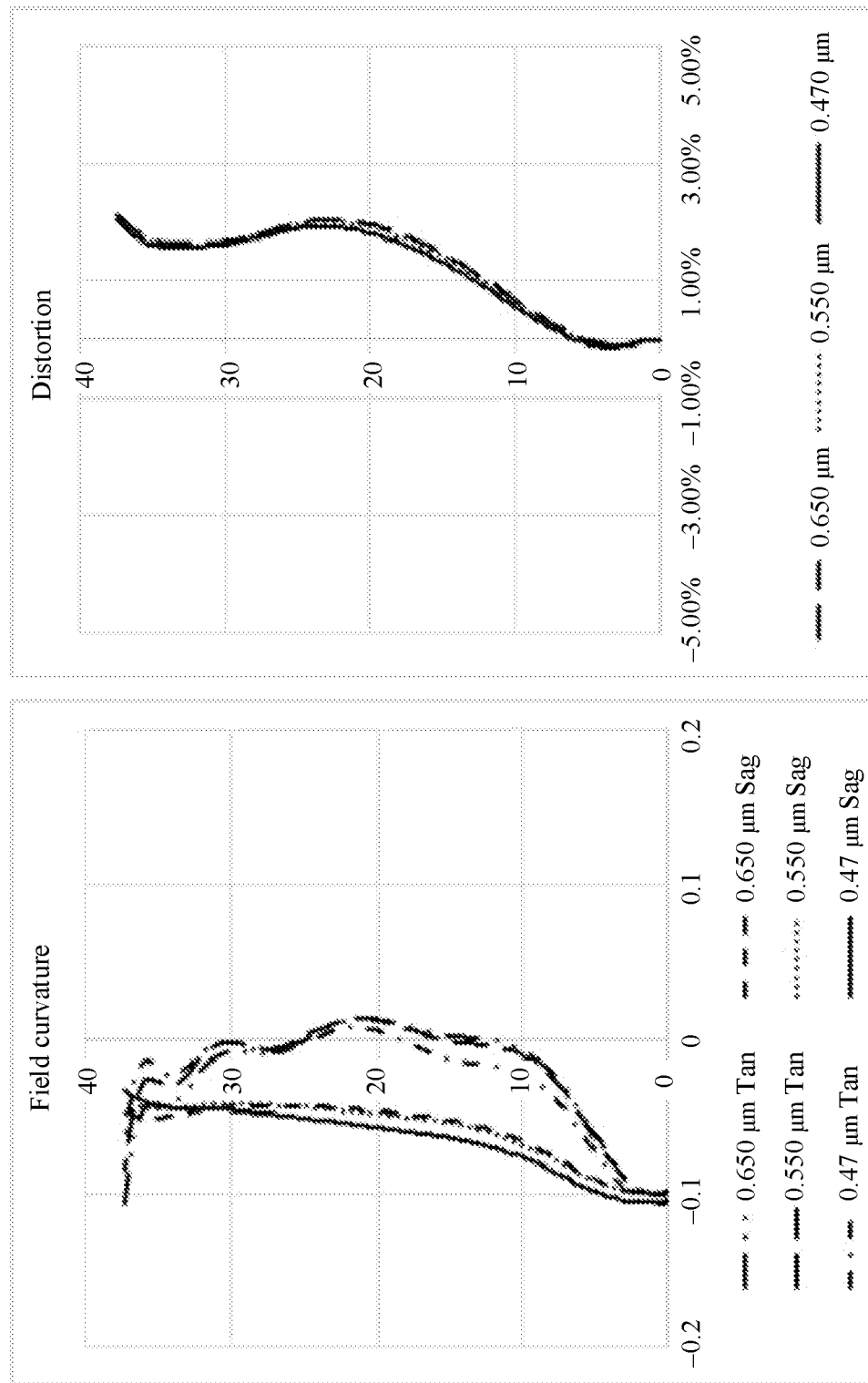
Figure 6A:
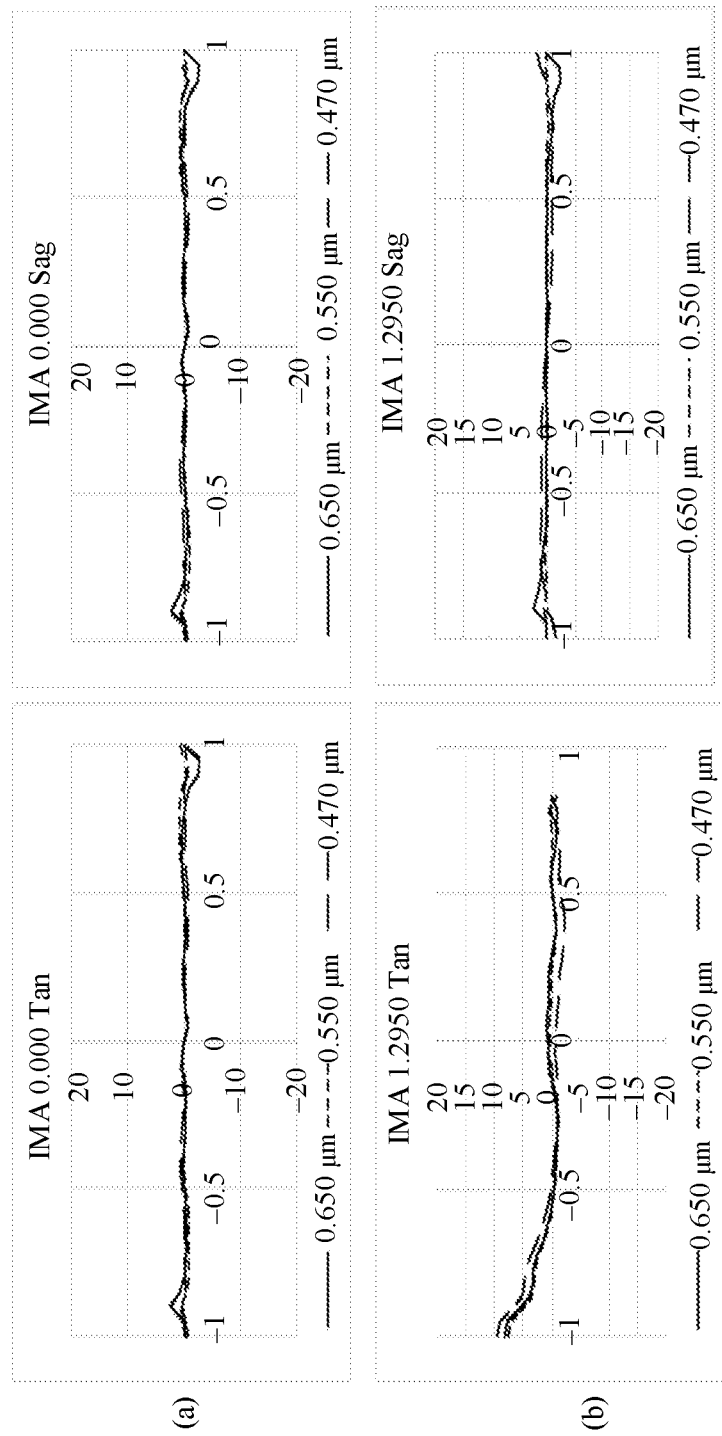
Figure 6B:
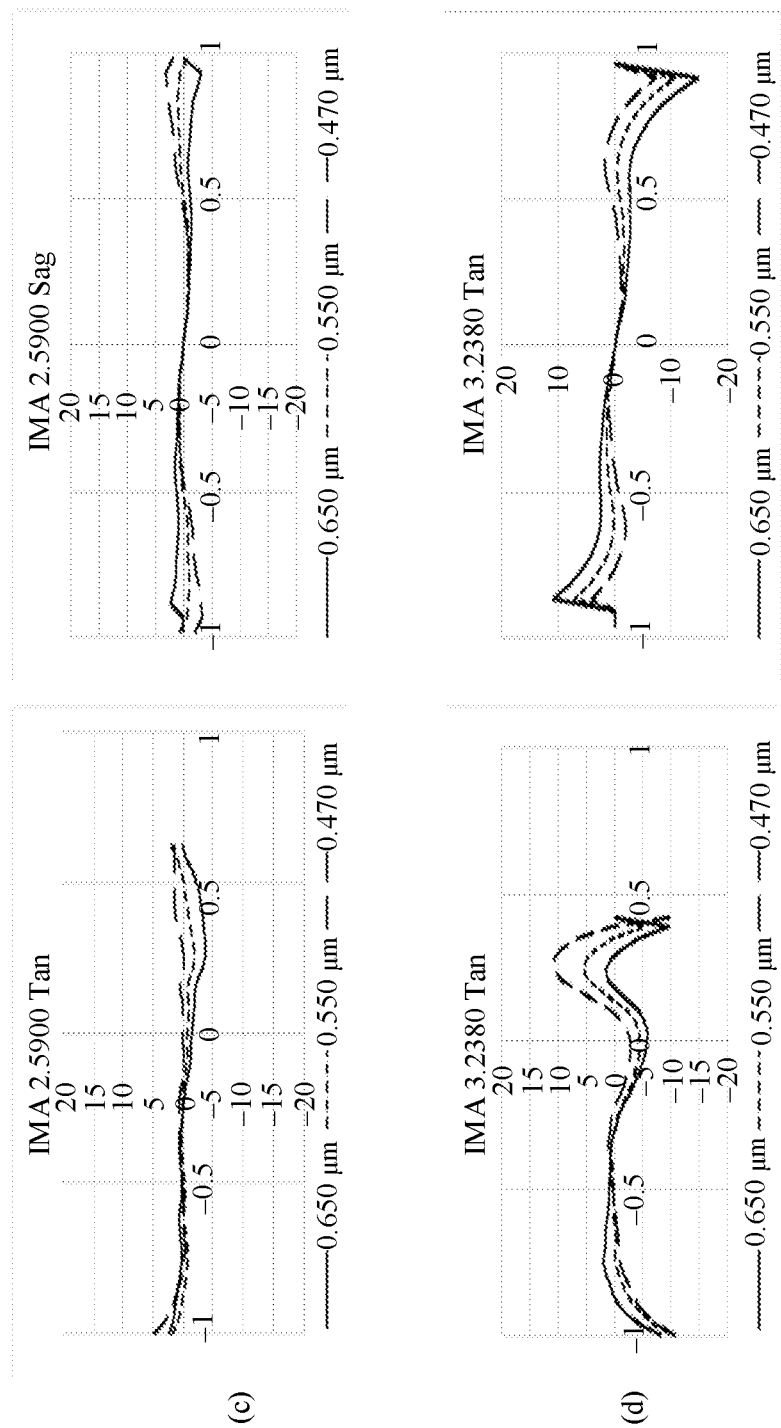
Figure 7:
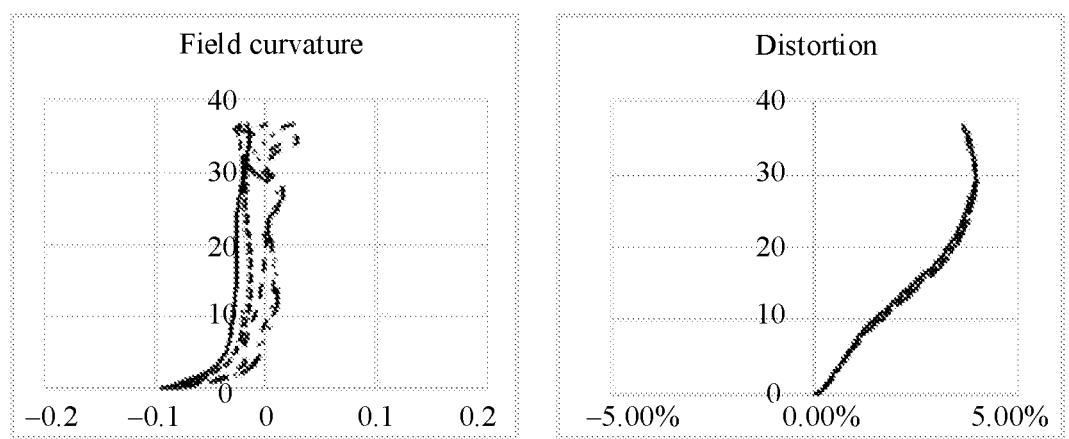
Figure 8:
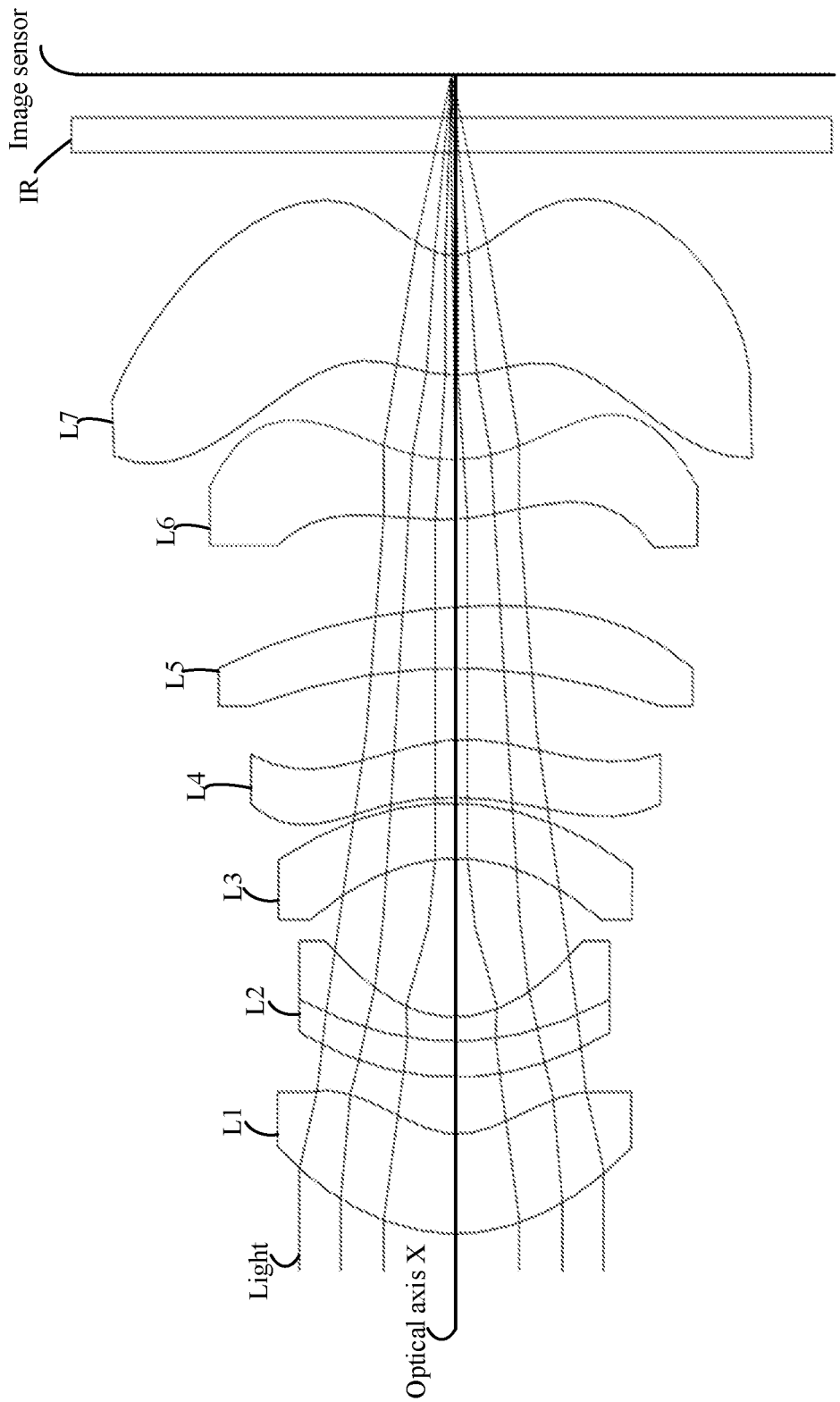
Figure 9:
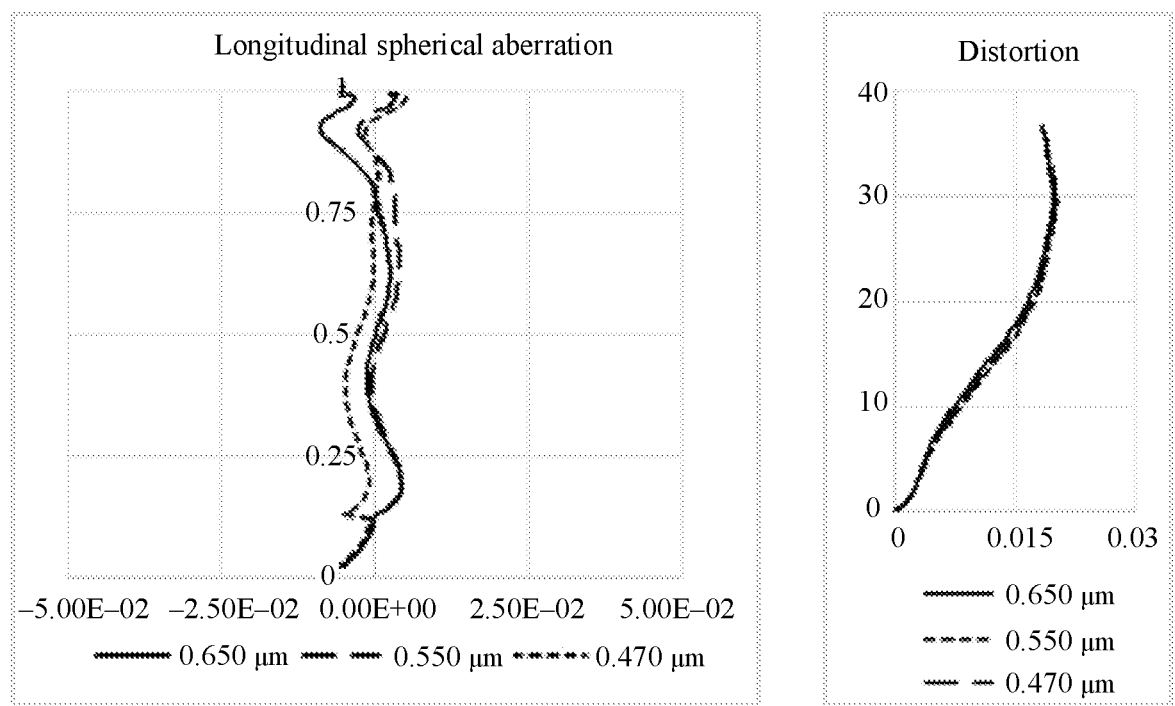

(a) to (d) in FIG. 4A and FIG. 4B are aberration line graphs of polychromatic light on a visible spectrum ranging from 470 nm to 650 nm according to an embodiment of the present invention;

FIG. 5 is a schematic diagram of simulation results of field curvature and distortion according to an embodiment of the present invention;

(a) to (d) in FIG. 6A and FIG. 6B are aberration line graphs of polychromatic light on a visible spectrum ranging from 470 nm to 650 nm according to an embodiment of the present invention;

FIG. 7 is a schematic diagram of simulation results of field curvature and distortion according to an embodiment of the present invention;

FIG. 8 is a schematic structural diagram of a camera lens including seven independent lenses and one IR, and a lens module according to an embodiment of the present invention; and FIG. 9 is a schematic diagram of simulation results of a longitudinal spherical aberration and distortion according to an embodiment of the present invention.

DESCRIPTION OF EMBODIMENTS

The following describes the embodiments of the present invention with reference to the accompanying drawings in the embodiments of the present invention.

Terms used in the implementation parts of the present invention are merely intended to explain specific embodiments of the present invention, but are not intended to limit the present invention. First, an aberration concept in the embodiments of the present invention is explained. An aberration (aberration) refers to inconsistency between a result obtained by non-paraxial ray tracing and a result obtained by paraxial ray tracing, that is, a deviation from an ideal condition of the Gaussian optics (first-order approximation theory or paraxial ray) in an optical system. The aberration is classified into two types: a chromatic aberration and a monochromatic aberration. A refractive index of a lens material is a function of a wavelength, and the chromatic aberration is an aberration generated because refractive indexes are different when light with different wavelengths passes through a lens. The chromatic aberration may be further classified into two types: a chromatism of position and a chromatic difference of magnification. The chromatic aberration is a dispersion phenomenon. In the dispersion phenomenon, a velocity of light or a refractive index changes with a wavelength of a light wave in a medium. Dispersion in which a refractive index of light decreases with an increase of the wavelength may be referred to as normal dispersion, while dispersion in which a refractive index of light increases with an increase of the wavelength may be referred to as negative dispersion (or referred to as negative abnormal dispersion). The monochromatic aberration refers to an aberration generated even with light of a single wavelength, and is further classified into two types by generated effects: a "causing imaging blur" type and a "causing imaging deformation" type. The former type includes a spherical aberration, astigmatism (astigmatism), and the like; and the latter type includes field curvature (field curvature, field curvature for short), distortion (distortion), and the like.

The following describes a camera module provided in the embodiments of the present invention. The camera module includes a camera lens and an image sensor. The camera lens may be installed between a photographed object (object plane) and the image sensor (image plane). The camera lens is configured to form an image of the photographed object (namely, an optical signal). The image sensor is configured to convert the image of the photographed object (namely, the optical signal) into an image signal and output the image signal, so as to implement a photographing or video recording function of the camera module. The camera module may be applied to terminal products such as a smartphone, a notebook computer, a desktop computer, a tablet computer, a personal digital assistant (PDA), a wearable device, an augmented reality (AR) device, a virtual reality (VR) device, and a monitoring device.

Figure 1:
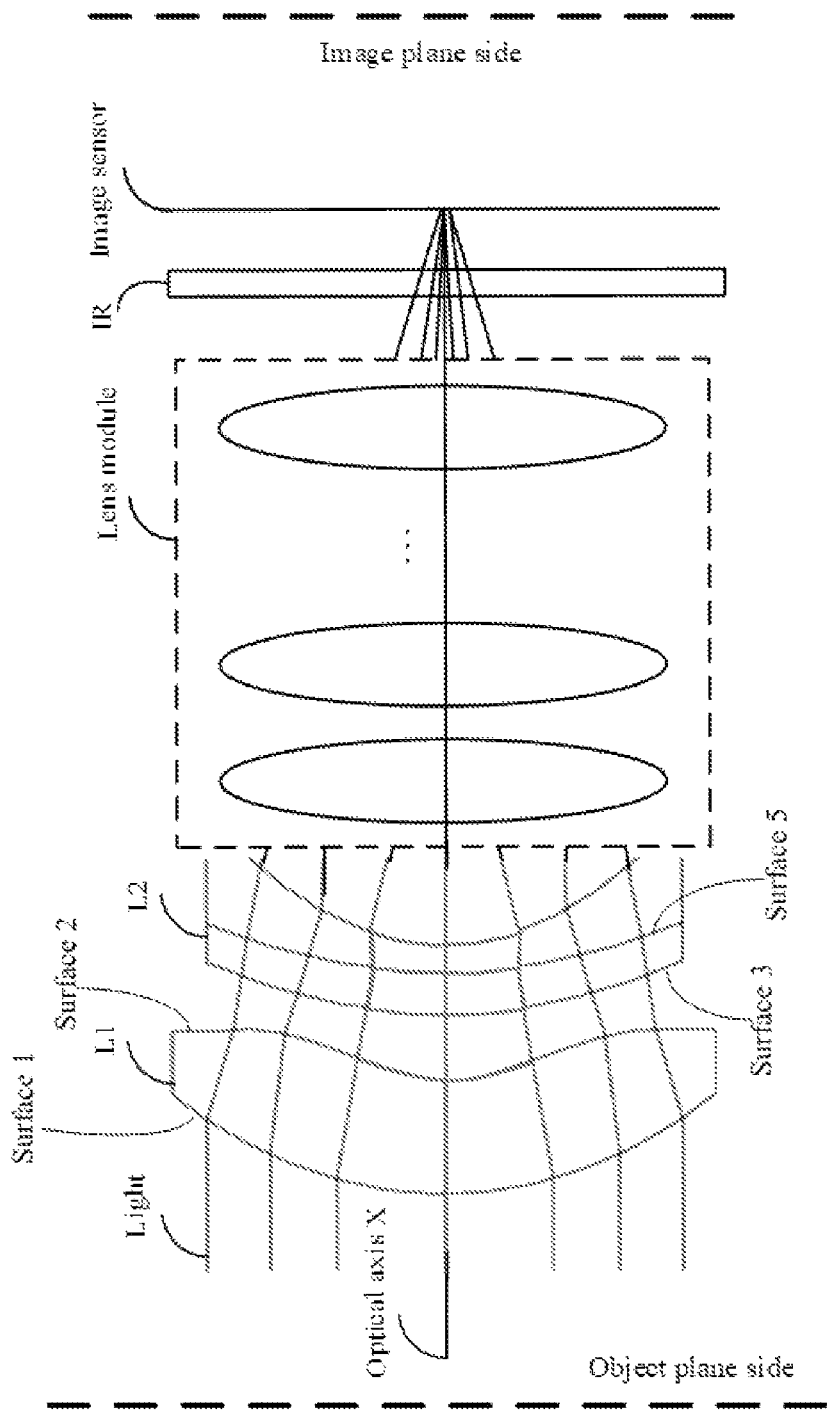
FIG. 1 is a schematic diagram of a structural framework of a camera module according to an embodiment of the present invention.

FIG. 1 is a schematic diagram of a structural framework of a camera module. As shown in FIG. 1, a camera lens is disposed between an image sensor and an object plane, to form an image of a photographed object and reflect the image to the image sensor. Therefore, a side on which the photographed object is located may be referred to as an object plane (or referred to as an object plane side), and a side on which the image sensor is located is referred to as an image plane (or referred to as an image plane side). Further, from the object plane side to the image plane side along an optical axis X, the camera lens includes: a first lens L1, a second lens L2, a lens module including several lenses, and an infrared filter (IR Filter).

The first lens L1 includes two surfaces opposite to each other, and the two surfaces may be respectively referred to as surface 1 and surface 2. Surface 1 faces the object plane side, and surface 2 faces the image plane side. Surface 1 and surface 2 both are aspheric surfaces, so as to balance monochromatic aberrations such as a spherical aberration and astigmatism. In this example, L1 is in a meniscus shape, surface 1 is a convex surface at the optical axis X, surface 2 is a concave surface at the optical axis X, and L1 has a positive focal power.

Figure 2:
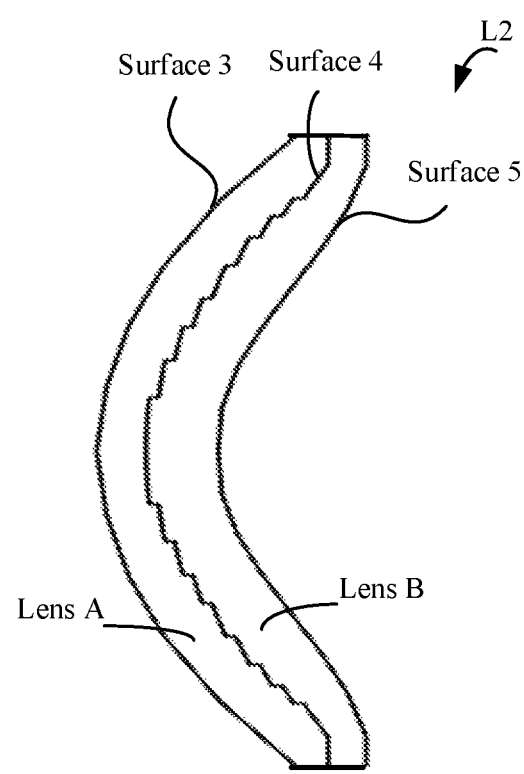
FIG. 2 is a schematic structural diagram of an diffractive optical element according to an embodiment of the present invention.

The second lens L2 is a diffractive optical element. FIG. 2 is a schematic structural diagram of L2. As shown in FIG. 2, the diffractive optical element includes two layers of different optical materials (two lenses) and an optical diffraction grating between the two layers of optical materials. In various examples, the diffractive optical element is formed by sandwiching the optical diffraction grating between the two lenses. L2 may be considered as including three surfaces that are respectively referred to as surface 3, surface 4, and surface 5. Surface 3 and surface 5 are outer surfaces of L2; and at least one of surface 3 and surface 5 is an aspheric surface, so as to balance monochromatic aberrations such as a spherical aberration and astigmatism. Surface 3 faces the object plane side and is a convex surface, and surface 5 faces the image plane side and is a concave surface. Surface 4 is formed by the diffraction grating inside L2, and may be a spherical surface or an aspheric surface.

In one embodiment, a thickness of lens A in the diffractive optical element is H1, and H1 meets 0 mm<H1<0.5 mm; and a thickness of lens B is H2, and H2 meets 0 mm<H2<0.5 mm. The diffraction grating is disposed between lens A and lens B. A grating height Gh of the diffraction grating meets 0 μm<Gh<50 μm; in other words, a thickness of the diffraction grating is between 0-50 μm. The diffractive optical element has a negative dispersion property.

In one embodiment, the lens (which may be referred to as lens A for short) between surface 3 and surface 4 uses a low-dispersion sulfur resin material, and a range condition of a refractive index N1 of the material is 1.62<N1<1.76. The lens (which may be referred to as lens B for short) between surface 4 and surface 5 uses a high-dispersion polycarbonate material or a modified alkane material, and a range condition of a refractive index N2 of the material is 1.55<N2<1.64. An Abbe number $V_d21$ of the material used by lens A meets a range condition: $30<V_d21<60$; and an Abbe number $V_d22$ of the material used by lens B meets a range condition: $20<V_d22<40$. In a specific implementation, the Abbe number of lens A and the Abbe number of lens B that are of the diffractive optical element, an Abbe number of a lens in front of the diffractive optical element (namely, an Abbe number $V_d1$ of a material used by the first lens L1), and an Abbe number of a lens of the diffractive optical element (namely, an Abbe number $V_d3$ of a material used by a third lens L3 in the lens module) may further meet the following condition: $V_d1>V_d21>V_d22>V_d3$, or $V_d1<V_d21<V_d22<V_d3$.

In one embodiment, L2 in general has a positive focal power, and the focal power of L2 may be further divided into a focal power P1 of lens A and a focal power P2 of lens B. P1 may be a positive focal power, or may be a negative focal power, so as to disperse a focal power of a first lens L1; and P2 may be a positive focal power or a negative focal power, so as to compensate for an aberration. For example, both P1 and P2 may be positive focal powers. For another example, when P1 is a positive focal power, P2 may be a negative focal power, and an absolute value of P2 is less than P1. For another example, when P1 is a negative focal power, P2 may be a positive focal power, and an absolute value of P2 is greater than P1. In a specific implementation, P1 and P2 may further meet the following relationship: −4<P1/P2<4. The focal power P1 and the focal power P2 of the diffractive optical element, a focal power $P_{front}$ of the lens in front of the diffractive optical element (namely, the focal power of the first lens L1), and a focal power $P_{last}$ of the lens behind the diffractive optical element (namely, the focal power of the third lens L3 in the lens module) may further meet the following conditions: $Abs(P1/P_{front})<4$; and $Abs(P2/P_{last})<Abs(P1/P_{front})$, where Abs represents an absolute value function. Because two focal powers are used to disperse the focal power, a light refraction requirement of a single lens can be reduced, so that monochromatic aberrations such as a spherical aberration, astigmatism, and distortion that are caused by a single large focal power can be reduced, thereby implementing an ultra-wide aperture with a relatively short total track length.

In various embodiments, a main optical axis of the lens module, a main optical axis of the first lens, and a main optical axis of the second lens are mutually overlapped. The lens module includes N lenses arranged at intervals along the optical axis X, and main optical axes of the lenses are mutually overlapped. Each lens in the lens module has two surfaces, and a surface of each lens may be an aspheric surface. The lens module has a positive focal power to balance monochromatic aberrations such as a spherical aberration and astigmatism.

N is an integer greater than or equal to 3 and less than or equal to 7. For instance, the camera lens may include five to nine independent lenses. In one embodiment, N may be 4 or 5. For instance, the camera lens may include six or seven independent lenses. For a detailed implementation of the camera lens, refer to the following descriptions.

In this example, the infrared filter (IR) is disposed between the lens module and the image sensor (image plane IM), and is configured to cut off and filter an infrared ray, and the like.

In addition, in this embodiment, an aperture value Fno of the camera lens is between 2.0 to 1.2.

It should be noted that, in example implementations, all lenses in the camera lens may be made of plastic materials. L1 may use a low-dispersion cyclic olefin material. A lens in the lens module may use a conventional lens material (for example, a high-dispersion polycarbonate material or a low-dispersion cyclic olefin material) based on a structural design of the camera lens. For a specific material used by L2, refer to the foregoing descriptions. Details are not described herein again.

It should be further noted that the lens in accordance with the present disclosure is an optical element that is close to an optical axis and that has a focal power. For a surface shape of the lens, the "convex surface" and the "concave surface" refer to a shape near an axis (near the optical axis).

It can be seen that the camera lens provided in this embodiment includes the first lens, the diffractive optical element, and the lens module. On one hand, positive dispersion of refractive elements (such as L1 and the lens module) is canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement a wide aperture (for example, an F1.5 wide aperture or an F1.4 wide aperture) for image sensors of different sizes (for example, large-size image sensors of 1/2.8 inches to 1/2.3 inches), to improve imaging quality. In addition, in this embodiment of the present invention, parameters such as an aspheric coefficient, a thickness, a lens material, and a refractive index of each lens of the camera lens can be optimized to meet a miniaturization requirement of the camera lens (in other words, to implement a relatively short TTL). In other words, the camera lens provided in this embodiment of the present invention can not only implement both miniaturization and high imaging quality, but also meet a requirement of a size increase of the image sensor.

In addition, because the diffractive optical element in the camera lens may be made of a plastic material, and the first lens and the lens module may also be made of plastic materials, no low-dispersion glass material or another special inorganic material is required. Therefore, implementing this embodiment of the present invention further effectively reduces costs of the camera lens, meeting commercial application requirements.

Figure 3:
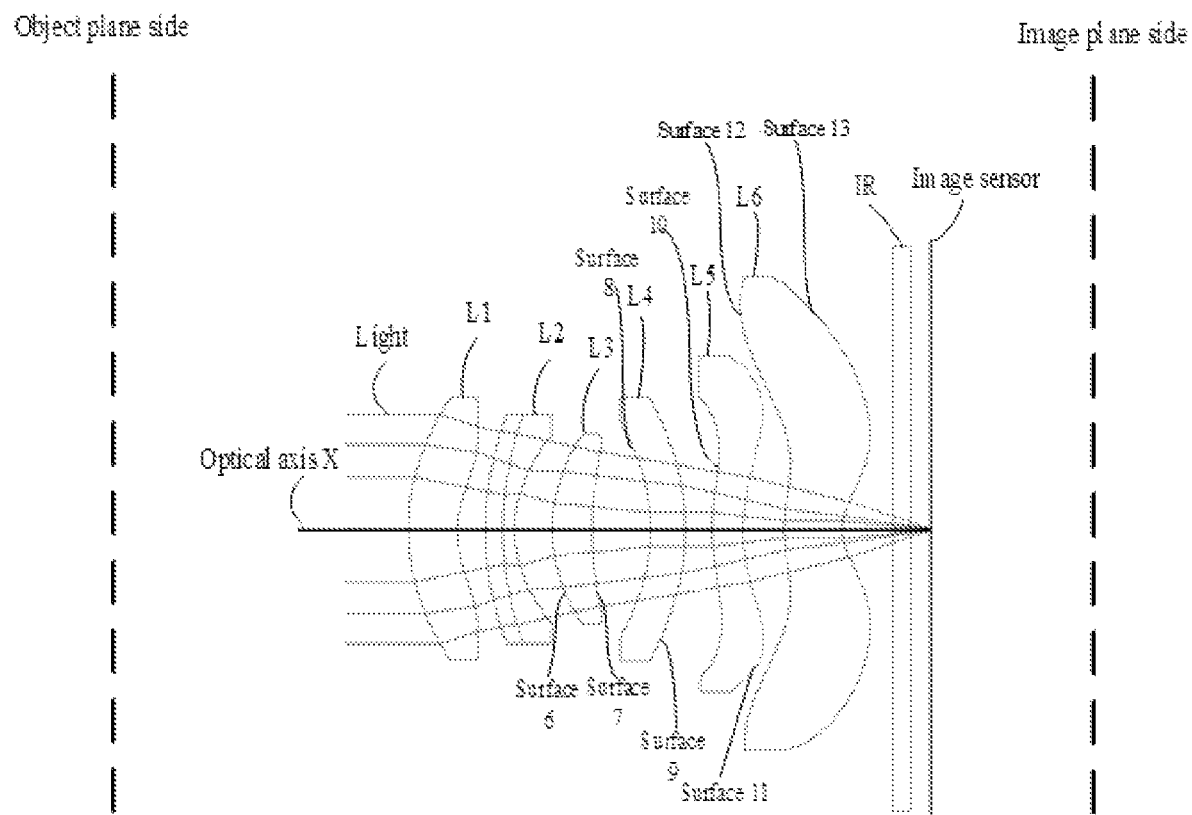
FIG. 3 is a schematic structural diagram of a camera lens including six independent lenses and one IR, and a lens module according to an embodiment of the present invention.

Based on a structural framework in the embodiment shown in FIG. 1, the following describes in detail an example implementation of the camera lens provided in various embodiments. Referring to FIG. 3, in this implementation, a lens module includes four lenses. In other words, a camera lens includes six independent lenses and one infrared filter. From an object plane side to an image plane side along an optical axis X, the camera lens successively includes: a first lens L1, a second lens L2, a third lens L3, a fourth lens L4, a fifth lens L5, and a sixth lens L6.

For the first lens L1, refer to related descriptions of L1 in the embodiment shown in and described in association with FIG. 1. Details are not described again.

For the second lens L2, refer to related descriptions of L2 in the embodiments shown in and described in association with FIG. 1 and FIG. 2. Details are not described again.

In this example, the third lens L3 includes two surfaces that may be respectively referred to as surface 6 and surface 7. Surface 6 faces the object plane side, and surface 7 faces the image plane side. At least one of surface 6 and surface 7 is an aspheric surface, so as to correct a residual aberration and reduce an astigmatism aberration. For instance, surface 6 is a convex surface at the optical axis X, surface 7 may be a convex surface or a concave surface at the optical axis X, and L3 has a positive focal power.

In this example, the fourth lens L4 includes two surfaces that may be respectively referred to as surface 8 and surface 9. Surface 8 faces the object plane side, and surface 9 faces the image plane side. Specifically, L4 is in a meniscus shape, and surface 8 is a concave surface at the optical axis X. L4 may be used to correct an on-axis chromatic aberration (which is a chromatism of position), well correct a chromatic difference of magnification, and correct distortion in an image plane of a low image height to an approximately 70% image height. L4 has a relatively weak positive focal power or negative focal power.

In this example, the fifth lens L5 includes two surfaces that may be respectively referred to as surface 10 and surface 11. Surface 10 faces the object plane side, and surface 11 faces the image plane side. Surface 10 and surface 11 both are aspheric surfaces, so as to correct a spherical aberration of a peripheral part of the lens. Using L5 further helps control an angle of light emitted from L5 to an appropriate angle between a low image height and a maximum image height. Specifically, L5 is in a meniscus shape, surface 10 is a convex surface at the optical axis X, and surface 11 is a concave surface at the optical axis X. In addition, in surface 10 and/or surface 11, there is a reverse curve point at a location far away from the optical axis X. In other words, a peripheral part of surface 10 and/or surface 11 bends towards the object plane side.

In this example, the sixth lens L6 includes two surfaces that may be respectively referred to as surface 12 and surface 13. Surface 12 faces the object plane side, and surface 13 faces the image plane side. Surface 12 and surface 13 both are aspheric surfaces. Specifically, surface 12 is a convex surface at the optical axis X, surface 13 is a concave surface at the optical axis X, and L6 has a negative focal power, which helps ensure a back focal length, correct astigmatism, and control an incidence angle of main light towards an image sensor. Specifically, in surface 13, there is a reverse curve point at a location far away from the optical axis X.

In other words, surface 13 is an aspheric surface that is a concave surface near the optical axis X and that is changed into a convex surface gradually at a periphery part of surface 13. Therefore, as a focal power of L6 is gradually oriented to a peripheral part of the lens, a negative focal power of L6 is weaker, or the negative focal power of L6 is gradually changed into a positive focal power at the peripheral part. Forming such an aspheric surface helps control an incidence angle of main light towards the image sensor at each image height location. Specifically, surface 12 also has an aspheric surface of which a focal power is changed into a positive focal power at a peripheral part. In this way, the peripheral part of lens L6 allocates a required positive focal power to the two surfaces, to prevent a sharp shape change of L6.

It may be understood that the third lens L3, the fourth lens L4, the fifth lens L5, and the sixth lens L6 jointly constitute the "lens module" in this embodiment.

The infrared filter IR is disposed between the lens module and the image sensor, and is configured to cut off and filter an infrared ray, and the like.

It should be noted that, in example implementation, all lenses in the camera lens may be made of plastic materials. For instance, L1 may use a low-dispersion cyclic olefin material. L3, L4, L5, and L6 may use high-dispersion polycarbonate materials or low-dispersion cyclic olefin materials based on a structural design of the camera lens. For an example material used by L2, refer to the foregoing descriptions. Details are not described again.

It should be further noted that the "reverse curve point" in accordance with the present disclosure is a point on an aspheric surface whose tangent plane is vertical to an optical axis.

In one embodiment, the lenses in the camera lens described in the embodiment in FIG. 3 meet the following conditions (1) to (7):

(1) $50 < V_d 1 < 60$, where $V_d 1$ represents an Abbe number of the first lens L1 to a d line (namely, the d line in a sodium spectrum, and specifically, a reference wavelength of the d line is 589.3 nm);

(2) $30 < V_d 21 < 60$, where $V_d 1$ represents an Abbe number of lens A in the second lens L2 to the d line;

(3) $20 < V_d 22 < 40$, where $V_d 22$ represents an Abbe number of lens B in the second lens L2 to the d line;

(4) $50 < V_d 3 < 60$, where $V_d 3$ represents an Abbe number of the third lens L3 to the d line;

(5) $20 < V_d 4 < 30$, where $V_d 4$ represents an Abbe number of the fourth lens L4 to the d line;

(6) $1 < f1/f21 < 5$, where f1 represents a focal length of the first lens L1, and f21 represents a focal length of surface 3 and a focal length of surface 4 (a focal length of lens A) in the second lens L2 (namely, the diffractive optical element); and (7) $f21/f22 < 1$, where f21 represents the focal length of lens A in the second lens L2, and f22 represents a focal length of surface 4 and a focal length of surface 5 (a focal length of lens B) in the second lens L2 (namely, the diffractive optical element).

In this embodiment, based on conditions (1) to (5), the Abbe numbers of the first lens L1 to the fourth lens L4 to the d line are separately specified within proper ranges, so that an on-axis chromatic aberration and a chromatic difference of magnification can be well corrected. In addition, a proper plastic material can be easily selected for each lens based on the ranges specified above, so that costs of the camera lens are reduced.

In this embodiment, based on conditions (6) and (7), a focal length ratio between the first lens L1 and lens B in the second lens L2 is specified within a proper range, and a focal length ratio between lens A and lens B that are of the second lens L2 is specified within a proper range, so that various aberrations can be corrected while a total track length is shortened.

Based on the camera lens described in the embodiment in FIG. 3 and conditions (1) to (7), the following further describes lens parameters related to the camera lens in a specific application scenario. As shown in Table 1, surfaces represented by surface sequence numbers have a one-to-one correspondence with the surfaces provided above. For instance, a surface sequence number "1" represents surface 1, a surface sequence number "2" represents surface 2, a surface sequence number "3" represents surface 3, and so on. f represents a focal length of the entire camera lens; Fno represents an F value of the camera lens; ω represents a semi-angular field of view of the camera lens; and TTL represents a total track length of the camera lens. In this specification, the total track length (TTL) is a distance, on the optical axis X, between a surface that is of a lens closest to the object plane side and that faces the object plane side (for example, surface 1 of the first lens in this specification) and the image plane (IM) in an optical system. In addition, i represents a sequence number (for example, corresponding to each lens surface in the camera lens shown in the embodiment in FIG. 3) of a lens surface counted from the object plane side; r represents a curvature radius of a lens surface; d represents a distance between lens surfaces on the optical axis X; $N_d$ represents a refractive index of a lens surface to the d line; and $V_d$ represents an Abbe number of a lens surface to the d line.

TABLE 1

Value example 1 (unit: mm):
f = 3.99; Fno = 1.44; ω = 37.2°; and TTL = 5.12
Surface data

| Surface sequence number | Curvature radius r | Surface interval d | Refractive index $N_d$ | Abbe number $V_d$ |
|---|---|---|---|---|
| Object plane | Infinite | Infinite | | |
| 1 | 1.809 | 0.57 | 1.5445 | 55.987 |
| 2 | 2.300 | 0.160 | | |
| 3 | 1.889 | 0.172 | 1.6828 | 36.426 |
| 4 | 4.800 | 0.220 | 1.6397 | 23.529 |
| 5 | 1.845 | 0.122 | | |
| 6 | 2.931 | 0.490 | 1.5445 | 55.987 |
| 7 | 13.487 | 0.579 | | |
| 8 | −6.298 | 0.330 | 1.6509 | 21.523 |
| 9 | 6.460 | 0.05 | | |
| 10 | 2.331 | 0.450 | 1.6509 | 21.523 |
| 11 | 5.250 | 0.250 | | |
| 12 | 1.917 | 0.57 | 1.5445 | 55.987 |
| 13 | 1.550 | 0.655 | | |
| 14 | Infinite | 0.210 | 1.5168 | 64.167 |
| 15 | Infinite | 0.200 | | |
| Image plane | Infinite | | | |

The following further describes lens surfaces of each lens in the camera lens. In this embodiment, a lens surface of the camera lens may be an aspheric surface, and for these aspheric lens surfaces, an aspheric surface equation for a surface of the aspheric surface may be given by:

$$Z = \frac{cr^2}{1 + \sqrt{1 - (1+K)c^2 r^2}} + A_4 r^4 + A_6 r^6 + A_8 r^8 + A_{10} r^{10} + A_{12} r^{12} \ldots$$

Z represents a height parallel to a z axis in the lens surface; r represents a radial distance starting from a vertex; c is curvature of a surface at the vertex; K is a constant of the cone; and $A_4$, $A_6$, $A_8$, $A_{10}$, and $A_{12}$ represent aspheric coefficients respectively corresponding to order 4, order 6, order 8, order 10, and order 12. An aspheric surface of a proper order may be selected as required.

The following further provides a constant of the cone K and an aspheric coefficient that correspond to each lens surface in the camera lens in the application scenario, as shown in Table 2:

TABLE 2

|  | K | $A_4$ | $A_6$ | $A_8$ | $A_{10}$ | $A_{12}$ |
| --- | --- | --- | --- | --- | --- | --- |
| Surface 1 | −0.0277 | 0.054704365 | 0.041299755 | −0.46250077 | −0.12658186 | 0.006731545 |
| Surface 2 | −1.511 | −0.075658409 | −0.087257886 | −0.092511543 | −0.016639727 | 0.0008327780 |
| Surface 3 | −0.687 | 0.058488589 | 2.4934421 | 7.6980794 | 4.0503548 | 0.19220853 |
| Surface 4 | 0E+00 | 0E+00 | 0E+00 | 0E+00 | 0E+00 | 0E+00 |
| Surface 5 | 0.894 | 0.12942139 | 1.7097088 | 4.6533941 | 3.0374803 | 0.11913865 |
| Surface 6 | 3.689 | 0.087486381 | −0.53444668 | −4.7402138 | −2.7400963 | −0.124107 |
| Surface 7 | 0.722 | −0.15784226 | −1.5831155 | −3.8235721 | −2.0412824 | −0.0445895 |
| Surface 8 | 25.267 | 0.11459205 | 0.66922713 | −0.31130855 | −1.5006686 | −0.32449606 |
| Surface 9 | −14.139 | 0.38311759 | 0.67526473 | −1.1962971 | 0.32740191 | 0.067768342 |
| Surface 10 | 1.357 | 0.19445387 | −0.46368365 | −1.0788348 | −0.39986588 | −0.022165822 |
| Surface 11 | 3.205 | −0.69061971 | −1.7261166 | −0.032256126 | −0.10740546 | −0.005901576 |
| Surface 12 | −20.915 | −0.27675612 | 0.12453169 | −0.075551121 | −0.0097417913 | −0.000128301 |
| Surface 13 | −6.747 | −0.37491321 | −0.046787921 | 0.03238507 | 0.0021038401 | 0.00020410033 |

Based on Table 1 and Table 2, the following describes an experiment test result of the camera lens in this embodiment of the present invention.

(a) to (d) in FIG. 4A and FIG. 4B are aberration line graphs of polychromatic light on a visible spectrum ranging from 470 nm to 650 nm according to an embodiment of the present invention. As shown in FIG. 4A and FIG. 4B, aberrations (corresponding values on a vertical axis) that correspond to different imaging planes (a meridional image plane Tan, and a sagittal image plane Sag), that are at different fields of view (0 mm, 1.2950 mm, 2.590 mm, and 3.2380 mm), and that correspond to different wavelengths (0.650 μm, 0.550 μm, and 0.470 μm) are all less than 20 μm. In other words, aberrations of different imaging planes, different fields of view, and different wavelengths are well corrected.

FIG. 5 shows simulation results of field curvature (Field Curvature) and distortion (Distortion) according to an embodiment of the present invention. It can be seen from the simulation results shown in the figure that field curvature of different wavelengths (0.650 μm, 0.550 μm, and 0.470 μm) can be better compensated, and distortion of the different wavelengths (0.650 μm, 0.550 μm, and 0.470 μm) can also be controlled within 3%. Therefore, the camera lens provided in this embodiment of the present invention meets a design and application requirement. To be specific, within a TTL range of 5.12 mm, the camera lens may implement an F1.44 ultra-wide aperture, and an aberration can be excellently optimized.

It can be seen that the camera lens provided in this embodiment of the present invention includes six lenses, and the lens at location L2 is a diffractive optical element. On one hand, positive dispersion of refractive elements (such as L1 and the lens module) is canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement an ultra-wide aperture (for example, F1.44) for image sensors of different sizes (for example, large-size image sensors of 1/2.8 inches to 1/2.3 inches), to improve imaging quality. In addition, in this embodiment of the present invention, parameters such as an aspheric coefficient, a thickness, a lens material, and a refractive index of each lens of the camera lens can be optimized to meet a miniaturization requirement of the camera lens (for example, a TTL is 5.12 mm). In other words, the camera lens provided in this embodiment of the present invention can not only implement both miniaturization and high imaging quality, but also meet a requirement of a size increase of the image sensor.

In addition, because the diffractive optical element in the camera lens may be made of a plastic material, and the first lens and the lens module may also be made of plastic materials, no low-dispersion glass material or another special inorganic material is required. Therefore, implementing this embodiment of the present invention further effectively reduces costs of the camera lens, meeting commercial application requirements.

Based on the camera lens described in the embodiment in FIG. 3 and conditions (1) to (7), an embodiment of the present invention provides lens parameters related to the camera lens in another specific application scenario. As shown in Table 3, similarly, surfaces corresponding to surface sequence numbers have a one-to-one correspondence with the surfaces provided above; f represents a focal length of the entire camera lens; Fno represents an F value of the camera lens; co represents a semi-angular field of view of the camera lens; and TTL represents a total track length of the camera lens. In addition, i represents a sequence number (to be specific, corresponding to each lens surface in the camera lens shown in the embodiment in FIG. 2) of a lens surface counted from the object plane side; r represents a curvature radius of a lens surface; d represents a distance between lens surfaces on the optical axis X; $N_d$ represents a refractive index of a lens surface to the d line; and $V_d$ represents an Abbe number of a lens surface to the d line.

TABLE 3

Value example 2 (unit: mm):
f = 4.03; Fno = 1.48; ω = 37.2°; and TTL = 5.14
Surface data

| Surface sequence number | Curvature radius r | Surface interval d | Refractive index $N_d$ | Abbe number $V_d$ |
|---|---|---|---|---|
| Object plane | Infinite | Infinite | | |
| 1 | 1.855 | 0.620 | 1.5445 | 55.987 |
| 2 | 2.358 | 0.160 | | |
| 3 | 1.889 | 0.172 | 1.6828 | 36.426 |
| 4 | 4.800 | 0.220 | 1.6397 | 23.529 |
| 5 | 1.845 | 0.15 | | |
| 6 | 3.102 | 0.480 | 1.5445 | 55.987 |
| 7 | 19.722 | 0.675 | | |
| 8 | −14.906 | 0.336 | 1.6509 | 21.523 |
| 9 | 4.652 | 0.065 | | |
| 10 | 3.338 | 0.430 | 1.6509 | 21.523 |
| 11 | 7.656 | 0.177 | | |
| 12 | 1.482 | 0.493 | 1.5445 | 55.987 |
| 13 | 1.265 | 0.655 | | |
| 14 | Infinite | 0.210 | 1.5168 | 64.167 |
| 15 | Infinite | 0.20 | | |
| Image plane | Infinite | | | |

The following further describes lens surfaces of each lens in the camera lens. Similarly, in this embodiment, a lens surface of the camera lens may be an aspheric surface, and for these aspheric lens surfaces, an aspheric surface equation for a surface of the aspheric surface may be given by:

$$Z = \frac{cr^2}{1 + \sqrt{1 - (1 + K)c^2 r^2}} + A_4 r^4 + A_6 r^6 + A_8 r^8 + A_{10} r^{10} + A_{12} r^{12}$$

Z represents a height parallel to a z axis in the lens surface; r represents a radial distance starting from a vertex; c is curvature of a surface at the vertex; K is a constant of the cone; and $A_4$, $A_6$, $A_8$, $A_{10}$, and $A_{12}$ represent aspheric coefficients respectively corresponding to order 4, order 6, order 8, order 10, and order 12. An aspheric surface of a proper order may be selected as required.

The following further provides a constant of the cone K and an aspheric coefficient that correspond to each lens surface in the camera lens in the application scenario, as shown in Table 4:

present invention. As shown in FIG. 6A and FIG. 6B, aberrations (corresponding values on a vertical axis) that correspond to different imaging planes (a meridional image plane Tan, and a sagittal image plane Sag), that are at different fields of view (0 mm, 1.2950 mm, 2.590 mm, and 3.2380 mm), and that correspond to different wavelengths (0.650 μm, 0.550 μm, and 0.470 μm) are all less than 20 μm. In other words, aberrations of different imaging planes, different fields of view, and different wavelengths are well corrected.

FIG. 7 shows simulation results of field curvature and distortion according to an embodiment of the present invention. It can be learned from the simulation results shown in the figure that field curvature of different wavelengths (0.650 μm, 0.550 μm, and 0.470 μm) can be better compensated, and distortion of the different wavelengths (0.650 μm, 0.550 μm, and 0.470 μm) can also be controlled within 4%. Therefore, the camera lens provided in this embodiment of the present invention meets a design and application requirement. To be specific, within a TTL range of 5.14 mm, the camera lens may implement an F1.48 ultra-wide aperture, and an optical aberration can be excellently optimized.

It can be seen that the camera lens provided in this embodiment of the present invention includes six lenses, and the lens at location L2 is a diffractive optical element. On one hand, positive dispersion of refractive elements (such as L1 and the lens module) is canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement an ultra-wide aperture (for example, F1.48) for image sensors of different sizes (for example, large-size image sensors of 1/2.8 inches to 1/2.3 inches), to improve imaging quality. In addition, in this embodiment of the present invention, parameters such as an aspheric coefficient, a thickness, a lens material, and a refractive index of each lens of the camera lens can be optimized to meet a miniaturization requirement of the camera lens (for example, a TTL is 5.14 mm). In other words, the camera lens provided in this embodiment of the present invention can not only implement both miniaturization and high imaging quality, but also meet a requirement of a size increase of the image sensor.

TABLE 4

| | K | $A_4$ | $A_6$ | $A_8$ | $A_{10}$ | $A_{12}$ |
|---|---|---|---|---|---|---|
| Surface 1 | 0.001 | 0.054704365 | 0.041299755 | −0.46250077 | −0.12658186 | 0.0067315459 |
| Surface 2 | −1.511 | −0.075658409 | −0.087257886 | −0.092511543 | −0.016639727 | 0.00083277807 |
| Surface 3 | −0.687 | 0.058488589 | 2.4934421 | 7.6980794 | 4.0503548 | 0.19220583 |
| Surface 4 | 0E+00 | 0E+00 | 0E+00 | 0E+00 | 0E+00 | 0E+00 |
| Surface 5 | 0.894 | 0.12942139 | 1.7097088 | 4.6533941 | 3.0374803 | 0.11913865 |
| Surface 6 | 4.711 | 0.087486381 | −0.53444668 | −4.7402138 | −2.7400963 | −0.12410726 |
| Surface 7 | 87.587 | −0.15784226 | −1.5831155 | −3.8235721 | −2.0412824 | −0.044589563 |
| Surface 8 | −76.068 | 0.11459205 | 0.66922713 | −0.31130855 | −1.5006686 | −0.32449606 |
| Surface 9 | −432.233 | 0.38311759 | 0.67526473 | −1.1962971 | 0.32740191 | 0.067768342 |
| Surface 10 | 3.325 | 0.19445387 | −0.46368365 | −1.0788348 | −0.39986588 | −0.022165822 |
| Surface 11 | −31.186 | −0.69061971 | −1.7261166 | −0.032256126 | −0.10740546 | −0.0059015762 |
| Surface 12 | −22.338 | −0.27675612 | 0.12453169 | −0.075551121 | −0.0097417913 | −0.000128301 |
| Surface 13 | −3.155 | −0.37491321 | −0.046787921 | 0.03238507 | 0.0021038401 | 0.00020410033 |

Based on Table 3 and Table 4, the following provides an experiment test result of the camera lens in this embodiment.

(a) to (d) in FIG. 6A and FIG. 6B are aberration line graphs of polychromatic light on a visible spectrum ranging from 470 nm to 650 nm according to an embodiment of the In addition, because the diffractive optical element in the camera lens may be made of a plastic material, and the first lens and the lens module may also be made of plastic materials, no low-dispersion glass material or another special inorganic material is required. Therefore, implementing this embodiment of the present invention further effectively reduces costs of the camera lens, meeting commercial application requirements.

Based on the structural framework in the embodiment shown in FIG. 1, the following continue to describe in detail another example implementation of the camera lens provided in various embodiments. Referring to FIG. 8, in this implementation, a lens module includes five lenses. In other words, a camera lens includes seven independent lenses and one infrared filter.

From an object plane side to an image plane side along an optical axis X, the camera lens successively includes: a first lens L1, a second lens L2, a third lens L3, a fourth lens L4, a fifth lens L5, a sixth lens L6, and a seventh lens L7.

For the first lens L1, refer to related descriptions of L1 in the embodiment in FIG. 1. Details are not described herein again.

For the second lens L2, refer to related descriptions of L2 in the embodiments in FIG. 1 and FIG. 2. Details are not described herein again.

The third lens L3 includes two surfaces that may be respectively referred to as surface 6 and surface 7. Surface 6 faces the object plane side, and surface 7 faces the image plane side. At least one of surface 6 and surface 7 is an aspheric surface, so as to correct a residual aberration and reduce an astigmatism aberration. Specifically, surface 6 is a concave surface at the optical axis X, surface 7 may be a convex surface or a concave surface at the optical axis X, and L3 has a negative focal power.

The fourth lens L4 includes two surfaces that may be respectively referred to as surface 8 and surface 9. Surface 8 faces the object plane side, and surface 9 faces the image plane side. Specifically, L4 is in a meniscus shape, surface 8 is a concave surface at the optical axis X, and L4 may be used to correct an on-axis chromatic aberration (or referred to as a longitudinal chromatic aberration) and well correct a chromatic difference of magnification. L4 has a relatively weak positive focal power or negative focal power.

The fifth lens L5 includes two surfaces that may be respectively referred to as surface 10 and surface 11. Surface 10 faces the object plane side, and is a concave surface at the optical axis X; and surface 11 faces the image plane side. Surface 10 and surface 11 both are aspheric surfaces, so as to correct a spherical aberration of a peripheral part of the lens.

The sixth lens L6 includes two surfaces that may be respectively referred to as surface 12 and surface 13. Surface 12 faces the object plane side, and surface 13 faces the image plane side. Surface 12 and surface 13 both are aspheric surfaces. Specifically, surface 12 is a convex surface at the optical axis X, and has a reverse curve point at a location other than the optical axis; and surface 13 is a concave surface at the optical axis X, and has a reverse curve point at a location other than the optical axis. L6 has a negative focal power.

The seventh lens L7 includes two surfaces that may be respectively referred to as surface 14 and surface 15. Surface 14 faces the object plane side, and surface 15 faces the image plane side. Surface 14 and surface 15 both are aspheric surfaces. Specifically, surface 14 is a convex surface at the optical axis X, surface 15 is a concave surface at the optical axis X, and L7 has a negative focal power, which helps ensure a back focal length, correct astigmatism, and control an incidence angle of main light towards an image sensor. Specifically, in surface 15, there is a reverse curve point at a location far away from the optical axis X. In other words, surface 15 is an aspheric surface that is a concave surface near the optical axis X and that is changed into a convex surface gradually at a periphery part of surface 15. Therefore, as a focal power of L7 is gradually oriented to a peripheral part of the lens, a negative focal power of L7 is weaker, or the negative focal power of L7 is gradually changed into a positive focal power at the peripheral part. Forming such an aspheric surface helps control an incidence angle of main light towards the image sensor at each image height location. Specifically, surface 14 also has an aspheric surface of which a focal power is changed into a positive focal power at a peripheral part. In this way, the peripheral part of lens L7 allocates a required positive focal power to the two surfaces, to prevent a sharp shape change of L7.

The infrared filter IR is disposed between the lens module and the image sensor (image plane IM), and is configured to cut off and filter an infrared ray, and the like.

It should be noted that, in an example implementation of this embodiment of the present invention, all lenses in the camera lens may be made of plastic materials. L1 may specifically use a low-dispersion cyclic olefin material, and L3, L4, L5, L6, and L7 may use high-dispersion polycarbonate materials or low-dispersion cyclic olefin materials based on a structural design of the camera lens. For a specific material used by L2, refer to the foregoing descriptions. A refractive index and an Abbe number of the material used by L2 are different from the related refractive index and Abbe number of L2 in the embodiment in FIG. 3 (refer to Table 1, Table 3, and Table 5). Details are not described herein again.

Similarly, in one embodiment of the present invention, the lenses in the camera lens described in the embodiment in FIG. 8 meet the following conditions (1) to (7):

(1) $50<V_d1<60$, where $V_d1$ represents an Abbe number of the first lens L1 to a d line (namely, the d line in a sodium spectrum, and specifically, a reference wavelength of the d line is 589.3 nm);

(2) $30<V_d21<60$, where $V_d1$ represents an Abbe number of lens A in the second lens L2 to the d line;

(3) $20<V_d22<40$, where $V_d22$ represents an Abbe number of lens B in the second lens L2 to the d line;

(4) $50<V_d3<60$, where $V_d3$ represents an Abbe number of the third lens L3 to the d line;

(5) $20<V_d4<30$, where $V_d4$ represents an Abbe number of the fourth lens L4 to the d line;

(6) $1<f1/f21<5$, where f1 represents a focal length of the first lens L1, and f21 represents a focal length of surface 3 and a focal length of surface 4 (a focal length of lens A) in the second lens L2; and (7) $f21/f22<1$, where f21 represents the focal length of lens A in the second lens L2, and f22 represents a focal length of surface 4 and a focal length of surface 5 (a focal length of lens B) in the second lens L2.

In this embodiment, based on conditions (1) to (5), the Abbe numbers of the first lens L1 to the fourth lens L4 to the d line are separately specified within proper ranges, so that an on-axis chromatic aberration and a chromatic difference of magnification can be well corrected. In addition, a proper plastic material can be easily selected for each lens based on the ranges specified above, so that costs of the camera lens are reduced.

In this embodiment of the present invention, based on conditions (6) and (7), a focal length ratio between the first lens L1 and lens B in the second lens L2 is specified within a proper range, and a focal length ratio between lens A and lens B that are of the second lens L2 is specified within a proper range, so that various aberrations can be corrected while a total track length is shortened.

Based on the camera lens described in the embodiment in FIG. 8 and conditions (1) to (7), the following further describes lens parameters related to the camera lens in a specific application scenario, as shown in Table 5:

The following further provides a constant of the cone K and an aspheric coefficient that correspond to each lens surface in the camera lens in the application scenario, as shown in Table 6:

TABLE 6

| | K | $A_4$ | $A_6$ | $A_8$ | $A_{10}$ | $A_{12}$ | $A_{14}$ | $A_{16}$ |
|---|---|---|---|---|---|---|---|---|
| Surface 1 | −4.1720E−01 | 3.4530E−03 | 1.0781E−02 | −1.3960E−02 | 1.3871E−02 | −7.8521E−03 | 2.4286E−03 | −3.2536E−04 |
| Surface 2 | −1.3043E+01 | 4.7099E−02 | −1.1949E−01 | 9.9624E−02 | −4.1373E−02 | 7.8679E−03 | −2.1582E−04 | −9.9073E−05 |
| Surface 3 | 8.4415E−01 | −4.3213E−02 | −3.1945E−02 | −2.2742E−02 | 6.6531E−02 | −4.6596E−02 | 1.4386E−02 | −1.6660E−03 |
| Surface 4 | 0E+00 | 0E+00 | 0E+00 | 0E+00 | 0E+00 | 0E+00 | 0E+00 | 0E+00 |
| Surface 5 | 3.8781E+00 | 8.1416E−03 | −1.2035E−02 | −3.1199E−02 | 4.5387E−02 | −1.5681E−02 | −3.6917E−03 | 2.5410E−03 |
| Surface 6 | −4.9865E+01 | −1.8406E−02 | −4.7337E−02 | 6.2801E−02 | −7.7102E−02 | 5.2545E−02 | −2.0555E−02 | 3.7803E−03 |
| Surface 7 | 9.9266E+00 | −7.6149E−02 | 1.1240E−01 | −2.8116E−01 | 3.0913E−01 | −1.8070E−01 | 5.7103E−02 | −7.8710E−03 |
| Surface 8 | −1.1098E+01 | −9.4413E−02 | 1.6410E−01 | −3.1486E−01 | 3.0694E−01 | −1.4767E−01 | 3.5367E−02 | −3.4171E−03 |
| Surface 9 | −4.9940E+01 | −8.5423E−02 | 6.5964E−02 | −7.0159E−02 | 5.6891E−02 | −2.8421E−02 | 8.5085E−03 | −1.0854E−03 |
| Surface 10 | 1.0000E+01 | −9.7083E−02 | 8.0246E−02 | −5.3697E−02 | 3.8141E−02 | −1.6544E−02 | 3.7355E−03 | −3.6741E−04 |
| Surface 11 | −4.6145E+01 | −2.1651E−01 | 2.1073E−01 | −1.4352E−01 | 7.3057E−02 | −2.2741E−02 | 3.7130E−03 | −2.4516E−04 |
| Surface 12 | −2.7062E+00 | −1.6879E−01 | 1.0912E−01 | −6.1114E−02 | 2.0481E−02 | −5.1413E−03 | 9.6095E−04 | −8.3904E−05 |
| Surface 13 | 5.9653E−01 | −1.2703E−01 | 4.9522E−02 | −1.7672E−02 | 2.6329E−03 | 1.0414E−04 | −6.7234E−05 | 4.6496E−06 |
| Surface 14 | −4.9900E+01 | −1.9785E−01 | 8.6009E−02 | −1.9534E−02 | 2.6621E−03 | −2.1743E−04 | 9.8882E−06 | −1.9567E−07 |
| Surface 15 | −1.1847E+01 | −8.2472E−02 | 2.5934E−02 | −6.6823E−03 | 1.3789E−03 | −1.9136E−04 | 1.4377E−05 | −4.3020E−07 |

TABLE 5

Value example 3 (unit: mm):
f = 4.76; Fno = 1.45; ω = 39°; and TTL = 5.60 mm
Surface data

| Surface sequence number Object plane | Curvature radius r Infinite | Surface interval d Infinite | Refractive index $N_d$ | Abbe number $V_d$ |
|---|---|---|---|---|
| 1 | 1.889 | 0.890 | 1.5445 | 55.987 |
| 2 | 2.546 | 0.060 | | |
| 3 | 2.225 | 0.170 | 1.6845 | 36.30 |
| 4 | 4.100 | 0.160 | 1.6235 | 24.72 |
| 5 | 2.793 | 0.590 | | |
| 6 | −40.084 | 0.310 | 1.6509 | 21.523 |
| 7 | 291.705 | 0.020 | | |
| 8 | 55.743 | 0.380 | 1.5445 | 55.987 |
| 9 | −10.738 | 0.310 | | |
| 10 | −5.449 | 0.310 | 1.661 | 20.4 |
| 11 | −4.764 | 0.160 | | |
| 12 | 3.367 | 0.350 | 1.6509 | 21.523 |
| 13 | 3.126 | 0.360 | | |
| 14 | 5.882 | 0.650 | 1.5445 | 55.987 |
| 15 | 2.103 | 0.470 | | |
| 16 | Infinite | 0.210 | 1.5168 | 64.167 |
| 17 | Infinite | 0.200 | | |
| Image plane | Infinite | | | |

The following further describes lens surfaces of each lens in the camera lens. Similarly, in this embodiment, a lens surface of the camera lens may be an aspheric surface, and for these aspheric lens surfaces, an aspheric surface equation for a surface of the aspheric surface may be given by:

$$Z = \frac{cr^2}{1+\sqrt{1-(1+K)c^2r^2}} + A_4 r^4 + A_6 r^6 + A_8 r^8 + A_{10} r^{10} + A_{12} r^{12} + A_{14} r^{14} + A_{16} r^{16} \ldots$$

Z represents a height parallel to a z axis in the lens surface; r represents a radial distance starting from a vertex; c is curvature of a surface at the vertex; K is a constant of the cone; and $A_4$, $A_6$, $A_8$, $A_{10}$, $A_{12}$, $A_{14}$, and $A_{16}$ represent aspheric coefficients.

Based on Table 5 and Table 6, the following provides an experiment test result of the camera lens in this embodiment of the present invention.

FIG. 9 shows simulation results of a longitudinal spherical aberration (Longitudinal spherical ABER) and distortion according to an embodiment of the present invention. It can be learned from the simulation results shown in the figure that longitudinal spherical aberrations of different wavelengths (0.650 μm, 0.550 μm, and 0.470 μm) can be better compensated, and distortion of the different wavelengths (0.650 μm, 0.550 μm, and 0.470 μm) can also be controlled within 2%. Therefore, the camera lens provided in this embodiment of the present invention meets a design and application requirement. To be specific, within a TTL range of 5.60 mm, the camera lens may implement an F1.45 ultra-wide aperture, and an optical aberration can be excellently optimized and corrected.

It can be seen that the camera lens provided in this embodiment of the present invention includes seven lenses, and the lens at location L2 is a diffractive optical element. On one hand, positive dispersion of refractive elements (such as L1 and the lens module) is canceled by using negative dispersion of the diffractive optical element, so that an imaging chromatic aberration is effectively reduced. On the other hand, by using the lens module, monochromatic aberrations such as astigmatism, a spherical aberration, and distortion can be further balanced. Therefore, by using such a structural framework, a camera lens can be designed to implement an ultra-wide aperture (for example, F1.45) for image sensors of different sizes (for example, large-size image sensors of 1/2.8 inches to 1/2.3 inches), to improve imaging quality. In addition, in this embodiment of the present invention, parameters such as an aspheric coefficient, a thickness, a lens material, and a refractive index of each lens of the camera lens can be optimized to meet a miniaturization requirement of the camera lens (for example, a TTL is 5.60 mm). In other words, the camera lens provided in this embodiment of the present invention can not only implement both miniaturization and high imaging quality, but also meet a requirement of a size increase of the image sensor.

In addition, because the diffractive optical element in the camera lens may be made of a plastic material, and the first lens and the lens module may also be made of plastic materials, no low-dispersion glass material or another special inorganic material is required. Therefore, implementing this embodiment of the present invention further effectively reduces costs of the camera lens, meeting commercial application requirements.

It should be noted that, although in the foregoing embodiments, the diffractive optical element is described as being at location L2 of the camera lens, in one implementation, the diffractive optical element may alternatively be at another location (for example, L3, L4, or L5). For an implementation process thereof, refer to the foregoing descriptions. Details are not described herein again.

It should be further noted that, although in the foregoing embodiments, only one diffractive optical element is described, in one implementation, there may be a plurality of diffractive optical elements (for example, two diffractive optical elements, three diffractive optical elements, or four diffractive optical elements). For an implementation process thereof, refer to the foregoing descriptions. Details are not described herein again.

Based on a same inventive concept, an embodiment of the present invention further provides a lens module. The lens module includes the camera lens described above and an image sensor. The camera lens is configured to form an optical signal of a photographed object, and reflect the optical signal to the image sensor; and the image sensor is configured to convert the optical signal corresponding to the photographed object into an image signal.

Based on a same inventive concept, an embodiment of the present invention further provides a terminal. The described lens module is installed in the terminal.

In the foregoing embodiments, the descriptions of each embodiment have respective focuses. For a part that is not described in detail in an embodiment, refer to related descriptions in other embodiments.

As described above, the camera lens in the implementations is applied to terminal products such as a smartphone, a notebook computer, a desktop computer, a tablet computer, a personal digital assistant (PDA), a wearable device, an augmented reality (AR) device, a virtual reality (VR) device, and a monitoring device, so that a requirement of an increasing size of an image sensor can be met. In addition, because the camera lens has a relatively short total track length (TTL) and an ultra-wide aperture (such as F1.6, F1.5, or F1.4), an amount of light admitted by the camera lens can be increased by using the wide aperture. Therefore, imaging definition and color accuracy in a night scene or an indoor scene are improved, an image stabilization requirement for photographing and video recording is reduced, and design requirements of image sensors of different sizes are met, thereby facilitating implementations of miniaturization and high performance of the terminal products.

What is claimed is:

1. A camera lens, wherein from an object plane to an image plane along an optical axis, the camera lens comprises:
a first lens,
a second lens, and
a lens module,
the second lens is a diffractive optical element between the first lens and the lens module, the second lens being isolated and spaced apart from each of the first lens and the lens module;
a surface that is of the first lens and that faces an object plane side is a convex surface at the optical axis, a surface that is of the first lens and that faces an image plane side is a concave surface at the optical axis, and the first lens has a positive focal power;
the second lens comprising a diffractive optical element first lens surface facing the object plane side, a diffractive optical element second lens surface facing the image plane side, and a diffractive surface between the diffractive optical element first lens surface and the diffractive optical element second lens surface, wherein the diffractive optical element first lens surface facing the object plane side is a convex surface at the optical axis, the diffractive optical element second lens surface facing the image plane side is a concave surface at the optical axis, the diffractive surface is concave to the image side plane, and the second lens has a positive focal power; and
the lens module comprises N number of lenses arranged at intervals along the optical axis, wherein N is an integer greater than or equal to 3 and less than or equal to 7, at least one of a surface facing the object plane side and a surface facing the image plane side that are of each of the N lenses is an aspheric surface, and the lens module has a positive focal power; and, wherein optical axes of the first lens, the second lens, and the N lenses in the lens module are mutually overlapped,
wherein in the second lens, a refractive index of a material between the diffractive optical element first lens surface facing the object plane side and the diffractive surface is N1, and a refractive index of a material between the diffractive optical element second lens surface facing the image plane side and the diffractive surface is N2, wherein N1 and N2 meet the following conditions respectively:

$1.62 < N1 < 1.76$; and $1.55 < N2 < 1.64$.

2. The camera lens according to claim 1, wherein in the second lens, an Abbe number of material between the diffractive optical element first lens surface facing the object plane side and the diffractive surface to a d line of a sodium spectrum is $V_d21$, an Abbe number of material between the diffractive optical element second lens surface facing the image plane side and the diffractive surface to the d line of the sodium spectrum is $V_d22$, and $V_d21$ and $V_d22$ meet the following conditions respectively:

$30 < V_d21 < 60$; and $20 < V_d22 < 40$.

3. The camera lens according to claim 1, wherein in the second lens, a focal power of the material between the diffractive optical element first lens surface facing the object plane side and the diffractive surface is P1, and a focal power of the material between the diffractive optical element second lens surface facing the image plane side and the diffractive surface is P2, wherein P1 and P2 meet the following condition:

$-4 < P1/P2 < 4$.

4. The camera lens according to claim 1, wherein at least one of the diffractive optical element first lens surface facing the object plane side and the diffractive optical element second lens surface facing the image plane side is an aspheric surface.

5. The camera lens according to claim 1, wherein the lens module comprises the following four lenses: a third lens, a fourth lens, a fifth lens, and a sixth lens, wherein
- a surface that is of the third lens and that faces the object plane side is a convex surface at the optical axis, and the third lens has a positive focal power;
- the fourth lens is in a meniscus shape, and a surface that is of the fourth lens and that faces the object plane side is a concave surface at the optical axis;
- a surface that is of the fifth lens and that faces the object plane side is a convex surface at the optical axis, and the surface facing the object plane side has a reverse curve point at a location other than the optical axis; and
- a surface that is of the sixth lens and that faces the object plane side is a convex surface at the optical axis, a surface that is of the sixth lens and that faces the image plane side is a concave surface at the optical axis, the surface facing the image plane side has a reverse curve point at a location other than the optical axis, and the sixth lens has a negative focal power.

6. The camera lens according to claim 5, wherein each lens in the camera lens further meets the following conditions:
- $50<V_d1<60$, wherein $V_d1$ represents an Abbe number of the first lens to the d line of the sodium spectrum;
- $50<V_d3<60$, wherein $V_d3$ represents an Abbe number of the third lens to the d line of the sodium spectrum;
- $20<V_d4<30$, wherein $V_d4$ represents an Abbe number of the fourth lens to the d line of the sodium spectrum;
- $1<f1/f21<5$, wherein f1 represents a focal length of the first lens, and f21 represents a focal length of the surface facing the object plane side and the diffractive surface that are of the second lens; and
- $f21/f22<1$, wherein f22 represents a focal length of the surface facing the image plane side and the diffractive surface that are of the second lens.

7. A camera module comprising:
a camera lens, and
an image sensor;
the camera lens, from an object plane to an image plane along an optical axis, comprises a first lens, a second lens, and a lens module, the second lens is a diffractive optical element disposed between the first lens and the lens module, the second lens being isolated and spaced apart from each of the first lens and the lens module;
a surface that is of the first lens and that faces an object plane side is a convex surface at the optical axis, a surface that is of the first lens and that faces an image plane side is a concave surface at the optical axis, and the first lens has a positive focal power;
the second lens comprises a diffractive optical element first lens surface facing the object plane side, a diffractive optical element second lens surface facing the image plane side, and a diffractive surface between the diffractive optical element first lens surface and the diffractive optical element second lens surface, wherein the diffractive optical element first lens surface facing the object plane side is a convex surface at the optical axis, the diffractive optical element second lens surface facing the image plane side is a concave surface at the optical axis, the diffractive surface is concave to the image side plane, and the second lens has a positive focal power; and
the lens module comprises N number of lenses arranged at intervals along the optical axis, wherein N is an integer greater than or equal to 3 and less than or equal to 7, at least one of a surface facing the object plane side and a surface facing the image plane side that are of each of the N lenses is an aspheric surface, and the lens module has a positive focal power; and, wherein optical axes of the first lens, the second lens, and the N lenses in the lens module are mutually overlapped;
the camera lens is configured to form a light pattern of a photographed object, and direct the light pattern to the image sensor; and
the image sensor is configured to convert the light pattern corresponding to the photographed object into an image signal,
wherein in the second lens, a refractive index of a material between the diffractive optical element first lens surface facing the object plane side and the diffractive surface is N1, a refractive index of a material between the diffractive optical element second lens surface facing the image plane side and the diffractive surface is N2, and N1 and N2 meet the following conditions respectively:

$1.62<N1<1.76$; and $1.55<N2<1.64$.

8. The camera module according to claim 7, wherein in the second lens, an Abbe number of the material between the diffractive optical element first lens surface facing the object plane side and the diffractive surface to a d line of a sodium spectrum is $V_d21$, an Abbe number of the material between the surface facing the image plane side and the diffractive surface to the d line of the sodium spectrum is $V_d22$, and $V_d21$ and $V_d22$ meet the following conditions respectively:

$30<V_d21<60$; and $20<V_d22<40$.

9. The camera module according to claim 7, wherein in the second lens, a focal power of the material between the diffractive optical element first lens surface facing the object plane side and the diffractive surface is P1, and a focal power of the material between the surface facing the image plane side and the diffractive surface is P2, wherein P1 and P2 meet the following condition:

$-4<P1/P2<4$.

10. A terminal comprising:
a display, and
a camera module comprising a camera lens and an image sensor;
from an object plane to an image plane along an optical axis, the camera lens comprises a first lens, a second lens, and a lens module,
the second lens is a diffractive optical element disposed between the first lens and the lens module, the second lens being isolated and spaced apart from each of the first lens and the lens module;
a surface that is of the first lens and that faces an object plane side is a convex surface at the optical axis, a surface that is of the first lens and that faces an image plane side is a concave surface at the optical axis, and the first lens has a positive focal power;
the second lens comprises a diffractive optical element first lens surface facing the object plane side, a diffractive optical element second lens surface facing the image plane side, and a diffractive surface between the diffractive optical element first lens surface and the diffractive optical element second lens surface, wherein the diffractive optical element first lens surface facing the object plane side is a convex surface at the optical axis, the diffractive optical element second lens surface facing the image plane side is a concave surface at the optical axis, the diffractive surface is concave to the image side plane, and the second lens has a positive focal power; and the lens module comprises N number of lenses arranged at intervals along the optical axis, wherein N is an integer greater than or equal to 3 and less than or equal to 7, at least one of a surface facing the object plane side and a surface facing the image plane side that are of each of the N lenses is an aspheric surface, and the lens module has a positive focal power; and, wherein optical axes of the first lens, the second lens, and the N lenses in the lens module are mutually overlapped;

the camera lens is configured to form a light pattern of a photographed object, and direct the light pattern to the image sensor;

the image sensor is configured to convert the light pattern corresponding to the photographed object into an image signal; and the display is configured to display an image photographed by the camera module, wherein in the second lens, a refractive index of a material between the diffractive optical element first lens surface facing the object plane side and the diffractive surface is N1, and a refractive index of a material between the diffractive optical element second lens surface facing the image plane side and the diffractive surface is N2, wherein N1 and N2 meet the following conditions respectively:

$1.62 < N1 < 1.76$; and $1.55 < N2 < 1.64$.

11. The terminal according to claim 10, wherein in the second lens, an Abbe number of the material between the diffractive optical element first lens surface facing the object plane side and the diffractive surface to a d line of a sodium spectrum is $V_d21$, an Abbe number of the material between the diffractive optical element second lens surface facing the image plane side and the diffractive surface to the d line of the sodium spectrum is $V_d22$, and $V_d21$ and $V_d22$ meet the following conditions respectively:

$30 < V_d21 < 60$; and $20 < V_d22 < 40$.

12. The terminal according to claim 10, wherein in the second lens, a focal power of the material between the diffractive optical element first lens surface facing the object plane side and the diffractive surface is P1, and a focal power of the material between the diffractive optical element second lens surface facing the image plane side and the diffractive surface is P2, wherein P1 and P2 meet the following condition:

$-4 < P1/P2 < 4$.

13. The terminal according to claim 10, wherein at least one of the diffractive optical element first lens surface facing the object plane side and the diffractive optical element second lens surface facing the image plane side is an aspheric surface.

14. The terminal according to claim 10, wherein the lens module comprises the following four lenses: a third lens, a fourth lens, a fifth lens, and a sixth lens, wherein a surface that is of the third lens and that faces the object plane side is a convex surface at the optical axis, and the third lens has a positive focal power;

the fourth lens is in a meniscus shape, and a surface that is of the fourth lens and that faces the object plane side is a concave surface at the optical axis;

a surface that is of the fifth lens and that faces the object plane side is a convex surface at the optical axis, and the surface facing the object plane side has a reverse curve point at a location other than the optical axis; and a surface that is of the sixth lens and that faces the object plane side is a convex surface at the optical axis, a surface that is of the sixth lens and that faces the image plane side is a concave surface at the optical axis, the surface facing the image plane side has a reverse curve point at a location other than the optical axis, and the sixth lens has a negative focal power.

* * * * *